United States Patent
Ohta

(10) Patent No.: US 10,829,112 B2
(45) Date of Patent: *Nov. 10, 2020

(54) DRIVING ASSISTANCE DEVICE

(71) Applicant: TOYOTA JIDOSHA KABUSHIKI KAISHA, Toyota (JP)

(72) Inventor: Teppei Ohta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 405 days.

This patent is subject to a terminal disclaimer.

(21) Appl. No.: 15/852,131

(22) Filed: Dec. 22, 2017

(65) Prior Publication Data
US 2018/0178784 A1 Jun. 28, 2018

(30) Foreign Application Priority Data

Dec. 26, 2016 (JP) ................. 2016-250553

(51) Int. Cl.
*B60W 30/09* (2012.01)
*G08G 1/16* (2006.01)
(Continued)

(52) U.S. Cl.
CPC ............ *B60W 30/09* (2013.01); *B60T 7/042* (2013.01); *B60T 7/22* (2013.01); *B60T 8/00* (2013.01);
(Continued)

(58) Field of Classification Search
None
See application file for complete search history.

(56) References Cited

U.S. PATENT DOCUMENTS 10,486,593 B2   11/2019  Ohta
2009/0088925 A1  4/2009  Sugawara et al.
(Continued)

FOREIGN PATENT DOCUMENTS

CN    1745316 A     3/2006
CN    104973055 A   10/2015
(Continued)

OTHER PUBLICATIONS

United States Patent and Trademark Office, Non-Final Office Action issued to U.S. Appl. No. 15/852,630 dated Jan. 25, 2019, 17 pages.
(Continued)

*Primary Examiner* — Peter D Nolan
*Assistant Examiner* — Demetra R Smith-Stewart
(74) *Attorney, Agent, or Firm* — Hunton Andrews Kurth LLP

(57) ABSTRACT

A driving assistance device includes a target information acquisition device, a vehicle state information acquisition device, and an electronic control unit. The electronic control unit is configured to determine whether a specific condition which is set so as to be established when vehicle control is needed in accordance with a result of comparison between an index value and a predetermined threshold is established, perform the vehicle control for avoiding contact of the host vehicle with an obstacle or abnormal proximity of the host vehicle to the obstacle when the specific condition is determined to be established, and change at least one of the predetermined threshold and the index value based on a lateral distance so that the specific condition has more of a tendency to be established as the lateral distance decreases.

9 Claims, 13 Drawing Sheets

(51) Int. Cl.
*B60T 7/22* (2006.01)
*B60T 7/04* (2006.01)
*B60T 8/00* (2006.01)
*B60T 8/17* (2006.01)

(52) U.S. Cl.
CPC ............... *B60T 8/17* (2013.01); *G08G 1/166* (2013.01); *B60T 2201/022* (2013.01); *B60T 2210/32* (2013.01); *B60W 2520/06* (2013.01); *B60W 2554/00* (2020.02); *B60W 2710/18* (2013.01)

(56) References Cited

U.S. PATENT DOCUMENTS

| | | |
|---|---|---|
| 2012/0027258 A1 | 2/2012 | Uchida et al. |
| 2014/0037138 A1 | 2/2014 | Sato et al. |
| 2015/0112566 A1* | 4/2015 | Takagi ............ B60T 7/22 701/70 |
| 2015/0291159 A1 | 10/2015 | Sasabuchi |
| 2016/0221574 A1 | 8/2016 | Ikuta et al. |

FOREIGN PATENT DOCUMENTS

| | | |
|---|---|---|
| JP | 2003291688 A | 10/2003 |
| JP | 2004230947 A | 8/2004 |
| JP | 2010102641 A | 5/2010 |
| JP | 2015-141490 A | 8/2015 |
| JP | 2015203983 A | 11/2015 |
| JP | 2016-141302 A | 8/2016 |
| WO | 2004068165 A1 | 8/2004 |

OTHER PUBLICATIONS

United States Patent and Trademark Office, Notice of Allowance issued to U.S. Appl. No. 15/852,630 dated Jul. 26, 2019, 7 pages.
United States Patent and Trademark Office, U.S. Appl. No. 15/852,630, filed Nov. 26, 2019.

* cited by examiner

DRIVING ASSISTANCE DEVICE

INCORPORATION BY REFERENCE

The disclosure of Japanese Patent Application No. 2016-250553 filed on Dec. 26, 2016 including the specification, drawings and abstract is incorporated herein by reference in its entirety.

BACKGROUND

1. Technical Field

The present disclosure relates to a driving assistance device that extracts an obstacle having the possibility of colliding with a host vehicle, and performs vehicle control with respect to the extracted obstacle.

2. Description of Related Art

One driving assistance device of the related art hitherto known (hereinafter, called a "driving assistance device of the related art") calculates a time to collision (TTC) which will be taken until an obstacle and a host vehicle collide with each other, and performs predetermined vehicle control on an obstacle for which the time to collision is equal to or less than a threshold. Further, the driving assistance device of the related art changes a threshold based on the time to collision for an obstacle, the presence or absence of an accelerator returning operation, and the like (see, for example, Japanese Unexamined Patent Application Publication No. 2015-141490 (JP 2015-141490 A)).

SUMMARY

Generally, an obstacle has a lateral width, but a time to collision is calculated as a time to be taken until substantially the center of the obstacle collides with a host vehicle. That is, the time to collision is not a time considering the lateral width of the obstacle. For this reason, for example, in a case where a vehicle is traveling straight ahead, there is a possibility of the same time to collision being calculated in an obstacle for which its endpoint of a lateral width is relatively close to the vehicle central line of the host vehicle due to the lateral width being relatively large, and an obstacle for which its endpoint of a lateral width is relatively distant from the vehicle central line of the host vehicle due to the lateral width being relatively small.

The obstacle for which the endpoint is relatively close to the vehicle central line of the host vehicle is more likely to collide with the host vehicle than the obstacle for which its endpoint is relatively distant from the vehicle central line of the host vehicle. For this reason, it is often preferable that vehicle control is performed at an earlier timing on the obstacle for which its endpoint is relatively close to the vehicle central line of the host vehicle than on the obstacle for which its endpoint is relatively distant from the vehicle central line of the host vehicle.

Since the driving assistance device of the related art changes a threshold based on the time to collision for a front obstacle, the presence or absence of an accelerator returning operation, and the like, there is the possibility that it is not possible to change the threshold in accordance with the lateral width of the obstacle, and to perform vehicle control on the obstacle at an appropriate timing.

The present disclosure provides a driving assistance device capable of performing vehicle control at an appropriate timing on an obstacle having a relatively high possibility of colliding with the host vehicle in consideration of the lateral width of the obstacle. Meanwhile, in the present specification, "the obstacle having a relatively high possibility of colliding with the host vehicle" is used as a term including both an obstacle having a relatively high possibility of colliding with the host vehicle and an obstacle very close to the host vehicle.

An aspect of the present disclosure relates to a driving assistance device. The driving assistance device includes a target information acquisition device configured to acquire target information relating to a position of a target around a host vehicle with respect to the host vehicle and a speed of the target relative to the host vehicle, a vehicle state information acquisition device configured to acquire vehicle state information relating to a traveling state of the host vehicle, and an electronic control unit. The electronic control unit is configured to estimate a traveling prediction course of a central point in a vehicle-width direction of the host vehicle based on the vehicle state information, extract a target having a possibility of colliding with the host vehicle, as an obstacle, based on the target information and the traveling prediction course, calculate a distance between an endpoint of the obstacle closest to the traveling prediction course and the traveling prediction course and set the calculated distance as a lateral distance, calculate an index value changing depending on a degree of need of vehicle control for avoiding contact of the host vehicle with the obstacle or abnormal proximity of the host vehicle to the obstacle based on at least the target information, determine whether a specific condition which is set so as to be established when the vehicle control is needed in accordance with a result of comparison between the index value and a predetermined threshold is established, and perform vehicle control for avoiding contact of the host vehicle with the obstacle or abnormal proximity of the host vehicle to the obstacle when the electronic control unit determines that the specific condition is established. The electronic control unit is configured to change at least one of the threshold and the index value based on the lateral distance such that the specific condition has more of a tendency to be established as the lateral distance decreases.

According to the aspect of the present disclosure, at least one of the threshold and the index value is changed such that the specific condition for performing vehicle control has more of a tendency to be established as the lateral distance between the "endpoint closest to the traveling prediction course of the host vehicle" of the obstacle and the traveling prediction course decreases. Thereby, even in a case where the index value is the same value, the specific condition has more of a tendency to be established as the endpoint of the obstacle and the traveling prediction course of the host vehicle become closer to each other. For this reason, vehicle control is performed at an earlier timing on an obstacle for which its endpoint is relatively close to the traveling prediction course than on an obstacle for which its endpoint is relatively distant from the traveling prediction course. As a result, it is possible to perform vehicle control at an appropriate timing on the obstacle for which its endpoint is relatively close to the traveling prediction course of the host vehicle, in consideration of the lateral width of the obstacle.

In the driving assistance device according to the aspect of the present disclosure, the electronic control unit may be configured to set the calculated distance as the lateral distance in a case where the obstacle is not located across the traveling prediction course, and to set the lateral distance to zero in a case where the obstacle is located across the traveling prediction course.

According to the aspect of the present disclosure, the lateral distance of the obstacle located across the traveling prediction course is set to zero. For this reason, a threshold or an index value is set for which the specific condition has most of a tendency to be established with respect to the obstacle, and thus it is possible to perform vehicle control at an original appropriate timing on the obstacle.

In the driving assistance device according to the aspect of the present disclosure, the electronic control unit may be configured to calculate an allowance time which is a time to be taken until the obstacle comes into contact with or comes closest to the host vehicle, as the index value. The electronic control unit may be configured to determine whether the specific condition is established by determining whether the allowance time as the index value is set to be equal to or less than a threshold time as the threshold. The electronic control unit may be configured to set a time increasing as the lateral distance decreases as the threshold time such that the specific condition has more of a tendency to be established as the lateral distance decreases.

According to the aspect of the present disclosure, the allowance time which is a time to be taken until the obstacle comes into contact with or comes closest to the host vehicle is used as the index value of whether vehicle control is performed. Therefore, it is possible to accurately determine whether vehicle control needs to be performed. Further, the threshold time compared with the allowance time is set to increase as the lateral distance decreases, and thus it is possible to perform vehicle control at an appropriate timing on the obstacle in a case where the allowance time is used as the index value.

In the driving assistance device according to the aspect of the present disclosure, the electronic control unit may be configured to specify a first endpoint and a second endpoint of the obstacle in a direction perpendicular to the traveling prediction course. The electronic control unit may be configured to adopt the smaller of a first distance which is a distance between the first endpoint and the traveling prediction course and a second distance which is a distance between the second endpoint and the traveling prediction course, as the lateral distance, in a case where the electronic control unit determines that both the first endpoint and the second endpoint are present in just one area of a right area and a left area divided by the traveling prediction course and that the obstacle is not located across the traveling prediction course.

According to the aspect of the present disclosure, the first endpoint and the second endpoint of the obstacle in a direction perpendicular to the traveling prediction course are specified, and the smaller of the distance (first distance) between the first endpoint and the traveling prediction course and the distance (second distance) between the second endpoint and the traveling prediction course is adopted as the lateral distance. For this reason, since an endpoint closest to the traveling prediction course can be accurately extracted, it is possible to calculate a more accurate lateral distance. Therefore, a threshold or an index value corresponding to the accurate lateral distance of the obstacle can be set, and thus there is a high possibility that vehicle control can be performed at an appropriate timing on the obstacle.

In the driving assistance device according to the aspect of the present disclosure, in a case where a plurality of obstacles extracted by the electronic control unit is present, the electronic control unit may be configured to calculate an index value after correction by correcting the index value calculated with respect to each of the extracted obstacles so as to be a value indicating that the degree of need of vehicle control becomes higher as a lateral distance for selection decreases which is a distance between a central point of each of the extracted obstacles in a direction perpendicular to the traveling prediction course and the traveling prediction course. The electronic control unit may be configured to select an obstacle for which the degree of need of vehicle control indicated by the index value after correction is highest, as an obstacle which is a target for processing, from the extracted obstacles. The electronic control unit may be configured to perform the vehicle control when the electronic control unit determines that the specific condition is established with respect to the obstacle which is a target for processing.

According to the aspect of the present disclosure, the index value is corrected so as to be a value indicating that the degree of need of vehicle control becomes higher as a distance between the central point of the obstacle in a direction perpendicular to the traveling prediction course and the traveling prediction course decreases. An obstacle for which the degree of need of vehicle control indicated by the index value after correction is highest is selected as an obstacle which is a target for processing. For this reason, an obstacle having a relatively close distance between the central point and the traveling prediction course, that is, an obstacle having a relatively high possibility of colliding with the host vehicle and having a relatively high possibility of vehicle control being needed is more likely to be selected as an obstacle which is a target for processing. Therefore, an obstacle having a need for vehicle control is accurately selected as an obstacle which is a target for processing, and thus it is possible to further increase the possibility that vehicle control is reliably performed on the obstacle which is a target for processing.

In the driving assistance device according to the aspect of the present disclosure, the electronic control unit may be configured to calculate an allowance time which is a time to be taken until the obstacle comes into contact with or comes closest to the host vehicle, as the index value. The electronic control unit may be configured to acquire an index value correction gain decreasing as the lateral distance for selection of each of the extracted obstacles decreases based on the lateral distance for selection, and to set an allowance time after correction, calculated by multiplying the index value correction gain by the allowance time, as the index value after correction. The electronic control unit may be configured to select an obstacle for which the allowance time after correction is smallest, as the obstacle which is a target for processing, from the extracted obstacles.

According to the aspect of the present disclosure, the allowance time which is a time to be taken until the obstacle comes into contact with or comes closest to the host vehicle is corrected by the index value correction gain decreasing as the lateral distance for selection decreases, and the allowance time after correction is used as an index value for selecting an obstacle which is a target for processing. Therefore, it is possible to further increase the possibility that an obstacle having a relatively high possibility of vehicle control needing to be performed can be selected as an obstacle which is a target for processing.

In the driving assistance device according to the aspect of the present disclosure, in a case where a plurality of obstacles extracted by the electronic control unit is present, the electronic control unit may be configured to calculate an index value after correction by correcting the index value calculated with respect to each of the extracted obstacles so as to be a value indicating that the degree of need of vehicle control becomes higher as a lateral distance for selection decreases which is the lateral distance calculated by the electronic control unit with respect to each of the extracted obstacles. The electronic control unit may be configured to select an obstacle for which the degree of need of vehicle control indicated by the index value after correction is highest, as an obstacle which is a target for processing, from the extracted obstacles. The electronic control unit may be configured to perform the vehicle control when the electronic control unit determines that the specific condition is established with respect to the obstacle which is a target for processing.

According to the aspect of the present disclosure, the index value is corrected so as to be a value indicating that the degree of need of vehicle control becomes higher as a distance between the endpoint of the obstacle closest to the traveling prediction course of the host vehicle and the traveling prediction course decreases. An obstacle for which the degree of need of vehicle control indicated by the index value after correction is highest is selected as an obstacle which is a target for processing. For this reason, an obstacle having a relatively close distance between the endpoint of the obstacle considering its lateral width and the traveling prediction course (that is, obstacle having a relatively high possibility of colliding with the host vehicle and having a relatively high possibility of vehicle control being needed) is more likely to be selected as an obstacle which is a target for processing. Therefore, an obstacle having a need for vehicle control is accurately selected as an obstacle which is a target for processing, and thus it is possible to further increase the possibility that vehicle control is reliably performed on the obstacle which is a target for processing.

In the driving assistance device according to the aspect of the present disclosure, the electronic control unit may be configured to calculate an allowance time which is a time to be taken until the obstacle comes into contact with or comes closest to the host vehicle, as the index value. The electronic control unit may be configured to acquire an index value correction gain decreasing as the lateral distance for selection of each of the extracted obstacles decreases based on the lateral distance for selection, and to set an allowance time after correction, calculated by multiplying the index value correction gain by the allowance time, as the index value after correction. The electronic control unit may be configured to select an obstacle for which the allowance time after correction is smallest, as the obstacle which is a target for processing, from the extracted obstacles.

According to the aspect of the present disclosure, the allowance time which is a time to be taken until the obstacle comes into contact with or comes closest to the host vehicle is corrected by the index value correction gain decreasing as the lateral distance for selection decreases, and the allowance time after correction is used as an index value for selecting an obstacle which is a target for processing. Therefore, it is possible to further increase the possibility that an obstacle having a relatively high possibility of vehicle control needing to be performed can be selected as an obstacle which is a target for processing.

In the driving assistance device according to the aspect of the present disclosure, the driving assistance device may further include a display device which displays an attention-attracting screen for guiding a driver's eyes. When the electronic control unit determines that the specific condition is established, the electronic control unit may be configured to perform, as the vehicle control, attention-attracting control for causing the display device to display a screen including a display element for guiding the driver's eyes in a direction of an obstacle having the index value by which the specific condition is established, as the attention-attracting screen.

According to the aspect of the present disclosure, a driver's attention can be attracted to an obstacle by guiding the driver's eyes to the obstacle for which the specific condition is established, and thus more suitable driving assistance is realized.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, a driving assistance device according to each embodiment of the present disclosure will be described with reference to the accompanying drawings.

First Embodiment

Figure 1:
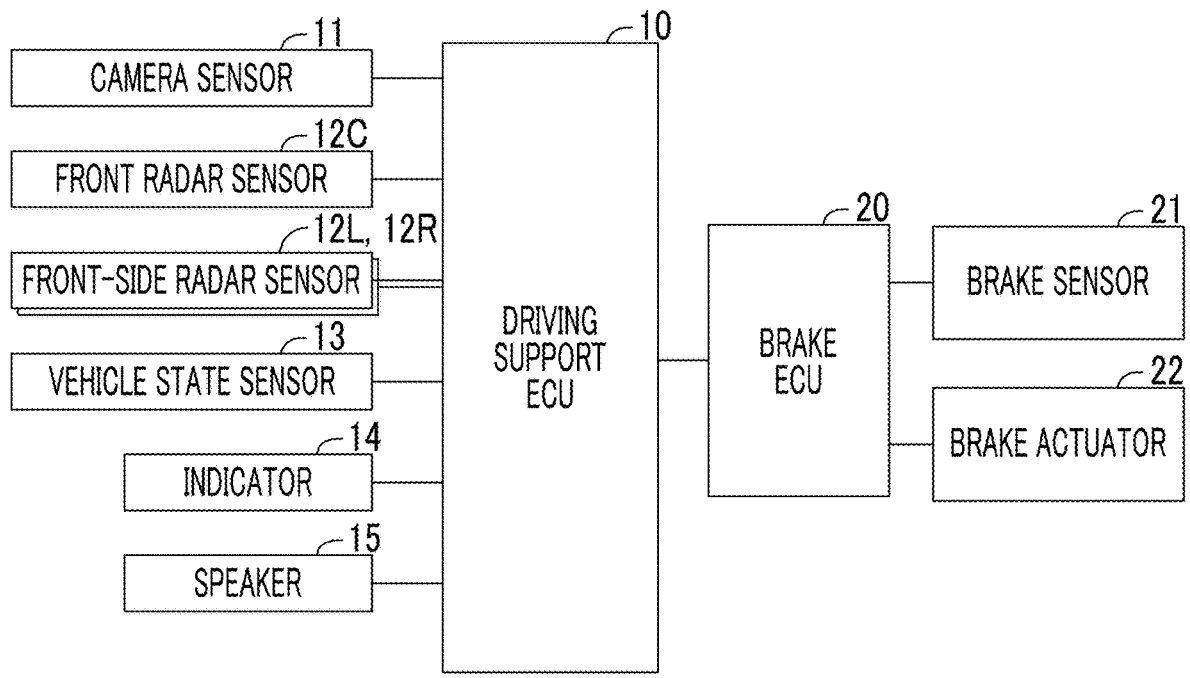
FIG. 1 is a schematic system configuration diagram of a driving assistance device according to a first embodiment of the present disclosure.

FIG. 1 is a schematic system configuration diagram of a driving assistance device (which may be hereinafter called a "first device") according to a first embodiment of the present disclosure. The first device is a device, mounted in a vehicle, which performs predetermined vehicle control on an obstacle having a relatively high possibility of colliding with the vehicle, and assists a driver's driving. Hereinafter, the vehicle having the driving assistance device according to the embodiment of the present disclosure mounted therein is called a "host vehicle" in a case of being needed to distinguish from other vehicles.

The first device includes a driving assistance ECU (an example of the "electronic control unit") 10. Meanwhile, the ECU is an abbreviation for "electronic control unit", and includes a microcomputer as a main portion. The microcomputer includes a CPU and storage devices such as a ROM and a RAM. The CPU realizes various functions by executing instructions (program, routine) stored in the ROM.

The first device further includes a camera sensor 11, a front radar sensor 12C, front-side radar sensors 12L, 12R, a vehicle state sensor 13, an indicator 14, a speaker 15, a brake ECU 20, a brake sensor 21 and a brake actuator 22. The driving assistance ECU 10 is connected to these components.

The camera sensor 11 includes an in-vehicle stereo camera that captures an image of the front of the host vehicle, and an image processing device that processes an image captured by the in-vehicle stereo camera (both are not shown in the drawing).

The in-vehicle stereo camera transmits an image signal indicating an image captured whenever a predetermined time elapses to the image processing device.

The image processing device determines the presence or absence of a target which is present in an image capture area, based on the received image signal. In a case where the image processing device determines that a target is present, the image processing device calculates the position of the target, and identifies the type (such as a pedestrian, a two-wheeled vehicle and an automobile) of the target through pattern matching. Meanwhile, the position of the target is specified by the direction (orientation) of the target with respect to the host vehicle and a distance between the target and the host vehicle. Further, the image processing device extracts (specifies) an endpoint (left endpoint) LEP on the left side of the target and an endpoint (right endpoint) REP on the right side of the target, and acquires information relating to the positions of the endpoints with respect to the host vehicle.

The camera sensor 11 outputs information indicating the position of the target (generally, the central position of the target, for example, the center between the left endpoint LEP and the right endpoint REP of the target) and information indicating the type of target to the driving assistance ECU 10 whenever a predetermined time elapses. Further, the camera sensor 11 outputs information relating to the positions of the left endpoint LEP and the right endpoint REP of the target with respect to the host vehicle to the driving assistance ECU 10 whenever a predetermined time elapses. The driving assistance ECU 10 specifies the transition of the position of the target based on the information indicating the position of the target received from the camera sensor 11. The driving assistance ECU 10 ascertains the speed and movement locus of the target relative to the host vehicle based on the specified transition of the position of the target.

Figure 2:
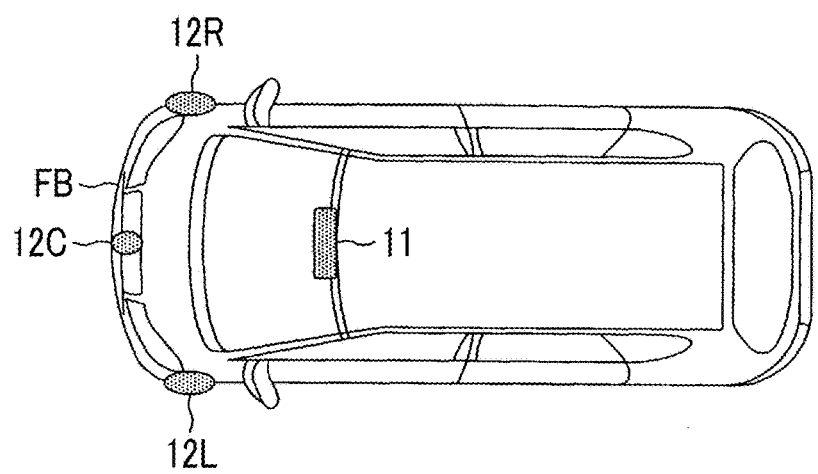
FIG. 2 is a diagram illustrating mounting positions of radar sensors and a camera sensor shown in FIG. 1.

As shown in FIG. 2, the front radar sensor 12C is provided at the central position of a front bumper FB of the host vehicle in a vehicle-width direction. The front-side radar sensor 12R is provided at the right corner portion of the front bumper FB. The front-side radar sensor 12L is provided at the left corner portion of the front bumper FB. Hereinafter, the front radar sensor 12C and the front-side radar sensors 12L, 12R are collectively called the "radar sensor 12".

The radar sensor 12 radiates radio waves (which may hereinafter be called "millimeter-waves") of a millimeter-wave band. In a case where a target is present in a millimeter-wave radiation range, the target reflects the millimeter-waves radiated from the radar sensor 12. The radar sensor 12 receives the reflected waves, and detects a distance between the host vehicle and the target (generally, the central position of the target), the direction (orientation) of the target with respect to the host vehicle, the speed of the target relative to the host vehicle, and the like, based on the reflected waves.

Figure 3:
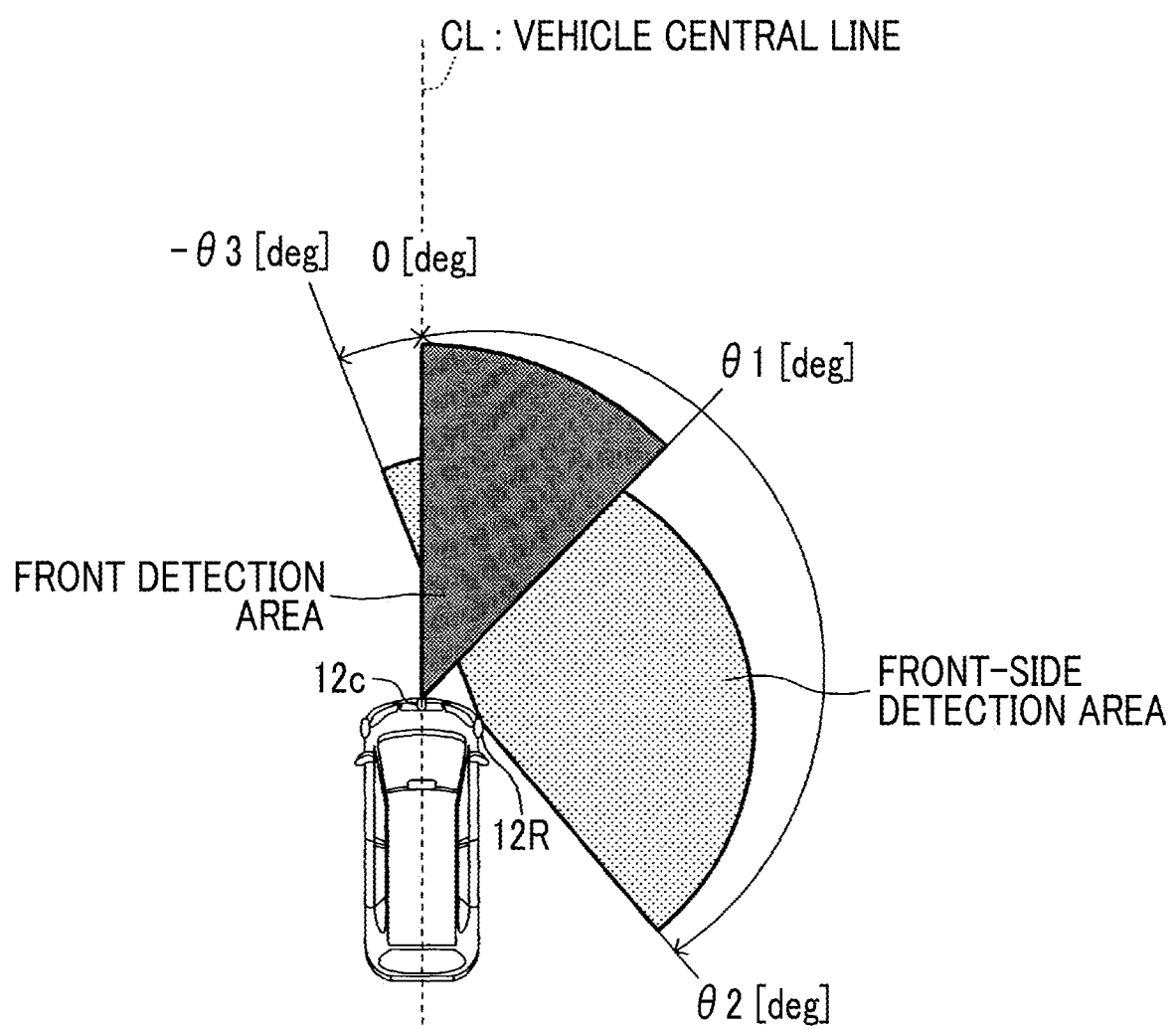
FIG. 3 is a diagram illustrating detection areas of the radar sensors shown in FIG. 1.

As shown in FIG. 3, a detection area of the front radar sensor 12C is a range of $\pm\theta 1$ deg (0 deg<$\theta 1$<90 deg) in a right-left direction from the longitudinal axis of the vehicle (the front is set to 0 deg) (FIG. 3 does not show a range in a left direction). Therefore, the front radar sensor 12C mainly detects a target in front of the host vehicle. On the other hand, a detection area of the front-side radar sensor 12R is a range between $\theta 2$ deg (90 deg<$\theta 2$<180 deg) in a right direction from the longitudinal axis of the vehicle and $-\theta 3$ deg (0 deg<$\theta 3$<90 deg) in a left direction. Therefore, the front-side radar sensor 12R mainly detects a target on the right side of the host vehicle. Although not shown in the drawing, a detection area of the front-side radar sensor 12L is an area obtained by setting the detection area of the front-side radar sensor 12R to be bilaterally symmetric with the longitudinal axis of the vehicle as an axis of symmetry. Therefore, the front-side radar sensor 12L mainly detects a target on the left side of the host vehicle. The detection distance of each of the radar sensors 12C, 12L, 12R is, for example, dozens of meters. Each of the radar sensors 12C, 12L, 12R detects position information (that is, a distance between the host vehicle and the target and the orientation of the target with respect to the host vehicle) of the target (generally, the central position of the target) and the speed of the target relative to the host vehicle whenever a predetermined time elapses, and transmits the position information and the relative speed detected whenever a predetermined time elapses to the driving assistance ECU 10. Therefore, the driving assistance ECU 10 ascertains the speed and movement locus of the target relative to the host vehicle based on the information sent from the radar sensor 12.

Hereinafter, information (including information indicating a distance between the substantially central position of the target and the host vehicle, the direction (orientation) of the substantially central position of the target with respect to the host vehicle, the speed of the target relative to the host vehicle, and the type of target) of the target detected by the camera sensor 11 and the radar sensor 12 is called target information. Meanwhile, the information acquired by the radar sensor 12 is preferentially used with respect to the distance between the target and the host vehicle and the speed relative to each other, and the information acquired by the camera sensor 11 is preferentially used with respect to the orientation of the target.

The vehicle state sensor 13 is a sensor that acquires vehicle state information relating to traveling states of the host vehicle which are needed in order to estimate a traveling prediction course RCR of the host vehicle. The vehicle state sensor 13 includes a vehicle speed sensor that detects the vehicle-body speed (that is, vehicle speed) of the host vehicle, an acceleration sensor that detects the acceleration of the host vehicle in a front-rear direction and a right-left (lateral) direction in a horizontal direction, a yaw rate sensor that detects the yaw rate of the host vehicle, a rudder angle sensor that detects the rudder angle of a steering wheel, and the like. The vehicle state sensor 13 outputs the vehicle state information to the driving assistance ECU 10 whenever a predetermined time elapses.

The driving assistance ECU 10 calculates a turning radius of the host vehicle based on the vehicle speed detected by the vehicle speed sensor and the yaw rate detected by the yaw rate sensor, and estimates a traveling course toward which the central point (in reality, central point between right-left front wheels of host vehicle on its axle) of the host vehicle in a vehicle-width direction is directed, as the traveling prediction course RCR, based on the turning radius. In a case where the yaw rate is generated, the traveling prediction course RCR is set to an arc shape. Further, in a case where the yaw rate is zero, the driving assistance ECU 10 estimates a straight course along the direction of the acceleration detected by the acceleration sensor to be a traveling course (that is, traveling prediction course RCR) toward which the host vehicle is directed. Meanwhile, the driving assistance ECU 10 recognizes (determines) the traveling prediction course RCR as a route (that is, line having a finite length) from the host vehicle to a point where the host vehicle has traveled by a predetermined distance along the traveling prediction course RCR, irrespective of the host vehicle being turning or being traveling straight ahead.

The indicator 14 is a head-up display (hereinafter, called a "HUD"). The HUD receives display information from a navigation device and various ECUs within the host vehicle, and displays the display information on a portion of an area (display area) of the windshield of the host vehicle. In a case where an obstacle on which vehicle control is to be performed is detected, the driving assistance ECU 10 transmits a display command of an attention-attracting screen to the HUD. Thereby, the HUD uses a portion of the display area to display the attention-attracting screen (see FIGS. 8 and 11) for guiding a driver's eyes in the direction of the obstacle. The attention-attracting screen will be described later in detail.

Meanwhile, the indicator 14 is not particularly limited to the HUD. That is, the indicator 14 may be a multi information display (MID), a touch panel of the navigation device, or the like. The MID is a display panel disposed on a dashboard by assembling meters such as a speedometer, a tachometer, a fuel gauge, a water temperature gauge, an odo/trip meter, and a warning lamp.

The speaker 15 is provided in a vehicle having the first device mounted therein. In a case where an obstacle on which vehicle control is to be performed is detected, the driving assistance ECU 10 transmits a command for generating a warning sound to the speaker 15. The speaker 15 outputs a warning sound in response to the command for generating a warning sound.

The brake ECU 20 is connected to a plurality of brake sensors 21, and is configured to receive detection signals of the brake sensors 21. The brake sensor 21 is a sensor that detects parameters used when a braking device (not shown) mounted in the host vehicle is controlled. The brake sensor 21 includes a brake pedal operation amount sensor, a wheel speed sensor that detects the rotation speed of each wheel, and the like.

Further, the brake ECU 20 is connected to the brake actuator 22. The brake actuator 22 is a hydraulic control actuator. The brake actuator 22 is disposed in a hydraulic circuit between a master cylinder that pressurizes hydraulic oil through the tread force of a brake pedal and a friction brake device including a well-known wheel cylinder provided in each wheel (which are all not shown in the drawing). The brake actuator 22 adjusts hydraulic pressure supplied to the wheel cylinder. The brake ECU 20 is configured to generate a braking force (friction braking force) in each wheel by driving the brake actuator 22, and to adjust the acceleration (negative acceleration, that is, deceleration) of the host vehicle.

The brake ECU 20 and the driving assistance ECU 10 are connected to each other through a communication sensor-based controller area network (CAN) so as to be capable of data exchange (communication). Therefore, the brake ECU 20 can adjust the acceleration of the host vehicle by driving the brake actuator 22 based on a signal transmitted from the driving assistance ECU 10.

Outline of Operation

The first device estimates the traveling prediction course RCR (see FIGS. 6A, 6B and 9) of the host vehicle based on the vehicle state information which is input from the vehicle state sensor 13. Further, a target (obstacle) having the possibility of collision is extracted based on the target information and the traveling prediction course RCR which are input from the camera sensor 11 and the radar sensor 12. The first device calculates an index value changing depending on the degree of need of vehicle control with respect to the obstacle. As the index value, an allowance time TTC (time to collision) is adopted which is a time to be taken until the obstacle comes into contact with or comes closest to the host vehicle. The first device selects an obstacle (obstacle for which the allowance time TTC is shortest) for which the degree of need of vehicle control indicated by the calculated index value is highest, as an obstacle which is a target for processing.

In a case where a result of comparison between the index value of the obstacle which is a target for processing and a predetermined threshold satisfies a specific condition, the first device performs vehicle control on the obstacle which is a target for processing. More specifically, in a case where the allowance time TTC for the obstacle which is a target for processing is equal to or less than a threshold (threshold time) T1th, the result of comparison between the index value of the obstacle which is a target for processing and the predetermined threshold satisfies the specific condition. Further, the first device performs control for displaying the attention-attracting screen (see FIGS. 8 and 11) for guiding a driver's eyes in the direction of the obstacle which is a target for processing, as vehicle control with respect to the obstacle which is a target for processing.

The first device obtains a distance between an "endpoint closest to the traveling prediction course RCR of the host vehicle" of the obstacle which is a target for processing and the traveling prediction course RCR as a lateral distance, and sets the above-described threshold T1th of the obstacle which is a target for processing in accordance with the lateral distance. More specifically, the first device sets a time increasing as the lateral distance of the obstacle which is a target for processing decreases as the threshold T1th. When the lateral distance is obtained, the first device extracts the left endpoint LEP located on the leftmost side of the obstacle which is a target for processing and the right endpoint REP located on the rightmost side thereof in a direction perpendicular to the traveling prediction course RCR from the central position of the front end portion of the host vehicle in a vehicle-width direction. The first device calculates a distance (first distance) between the left endpoint LEP of the obstacle which is a target for processing and the traveling prediction course RCR and a distance (second distance) between the right endpoint REP of the obstacle which is a target for processing and the traveling prediction course RCR. The first device acquires the smaller of the first distance and the second distance as the lateral distance. In reality, the first device sets the lateral position of an endpoint closer to the traveling prediction course RCR out of the left endpoint LEP and the right endpoint REP, as a lateral position for threshold calculation, based on the lateral distance. The first device sets the threshold T1th increasing as the lateral position for threshold calculation becomes closer to the traveling prediction course RCR.

Specific Operation

Figure 4:
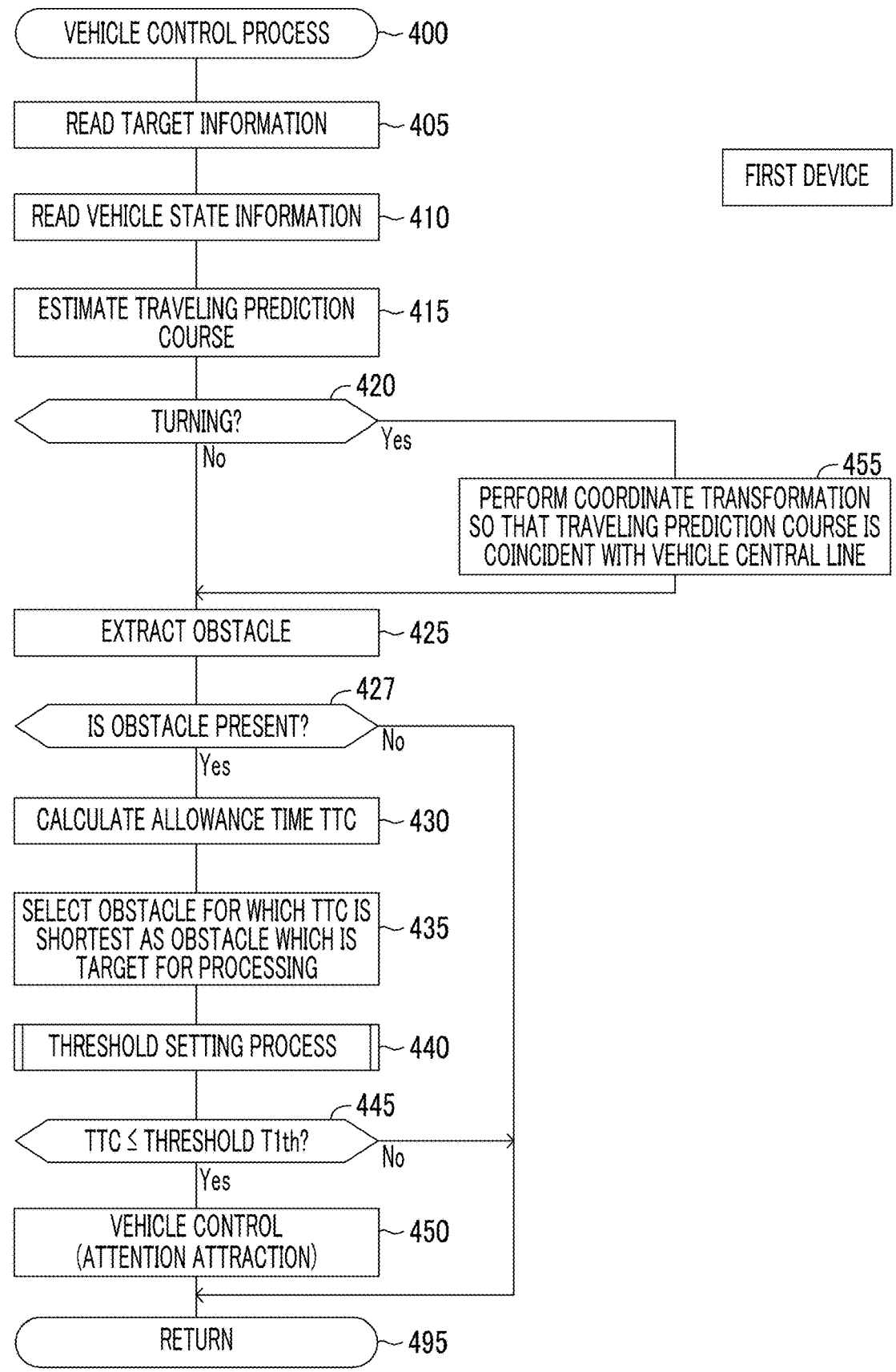
FIG. 4 is a flowchart illustrating a routine which is executed by the CPU of a driving assistance ECU shown in FIG. 1.

The CPU of the driving assistance ECU 10 (hereinafter, in a case of being denoted by the "CPU", the CPU of the driving assistance ECU 10 is referred to unless otherwise noted) executes a routine shown as a flowchart in FIG. 4 whenever a predetermined time elapses. The routine shown in FIG. 4 is a routine for performing vehicle control on an obstacle.

Therefore, in a case of arrival at a predetermined timing, the CPU starts a process from step 400 of FIG. 4, performs processes step 405 to step 415 described below in order, and proceeds to step 420.

Step 405: the CPU reads the target information acquired by the camera sensor 11 and radar sensor 12.

Step 410: the CPU reads the vehicle state information acquired by the vehicle state sensor 13.

Step 415: the CPU estimates the traveling prediction course RCR, as described above, based on the vehicle state information which is read in step 410.

In step 420, the CPU determines whether the host vehicle is turning based on the vehicle state information which is read in step 410. More specifically, the CPU determines that the host vehicle is turning in a case where a yaw rate included in the vehicle state information is generated (that is, in a case where the magnitude of the detected yaw rate is not "0"), and determines that the host vehicle is not turning in a case where the magnitude of the detected yaw rate is zero. Meanwhile, when a "difference between the wheel speed of the left front wheel and the wheel speed of the right front wheel" acquired from the wheel speed sensor is equal to or greater than a predetermined value, the CPU may determine that the host vehicle is turning.

In a case where the host vehicle is not turning, the CPU makes a determination of "No" in step 420, and proceeds to step 425. Meanwhile, a case where the host vehicle is not turning refers to any of a case where the host vehicle is traveling straight ahead and a case where the host vehicle is being stopped. The traveling prediction course RCR in a case where the host vehicle is traveling straight ahead is coincident with a vehicle central line CL (see FIG. 3). Further, the traveling prediction course RCR in a case where the host vehicle is being stopped is also coincident with the vehicle central line CL (see FIG. 3). The vehicle central line CL is a line extending forward along an axis extending in a front-rear direction from the central position of the front end portion of a host vehicle SV in a vehicle-width direction. In other words, the vehicle central line CL is a straight line extending in a direction perpendicular to a vehicle-width direction from the central position of the front end portion of the host vehicle SV in the vehicle-width direction.

In step 425, the CPU extracts a target (including a target very close to the host vehicle) having the possibility of colliding with the host vehicle, as an obstacle, based on the target information read in step 405 and the traveling prediction course RCR estimated in step 415. More specifically, as described above, the CPU estimates a traveling course toward which the central point (see a point PO shown in FIGS. 6A and 6B) between the right-left front wheels of the host vehicle on its axle is directed, as the traveling prediction course RCR. Further, the CPU estimates a left traveling prediction course (see a course LEC shown in FIGS. 6A and 6B) through which a point PL passes which is located further leftward by a constant distance αL from the left end portion of the vehicle body of the host vehicle and a right traveling prediction course (see a course REC shown in FIGS. 6A and 6B) through which a point PR passes which is located further rightward by a constant distance αR from the right end portion of the vehicle body of the host vehicle, based on the traveling prediction course RCR. The left traveling prediction course LEC is a course in which the traveling prediction course RCR estimated in step 415 is moved in parallel to the left side of the host vehicle in a right-left direction by a "value obtained by adding half (W/2) of a vehicle width W to the distance αL". The right traveling prediction course REC is a course in which the traveling prediction course RCR estimated in step 415 is moved in parallel to the right side of the host vehicle in a right-left direction by a "value obtained by adding half (W/2) of the vehicle width W to the distance αR". Both the distance αL and the distance αR are values equal to or greater than "0", and may be different from or the same as each other. Further, the CPU specifies an area between the left traveling prediction course LEC and the right traveling prediction course REC as a traveling prediction course area ECA.

The CPU calculates (estimates) the movement locus of the target based on the position of the past target. Further, the CPU calculates the direction of movement of the target with respect to the host vehicle, based on the calculated movement locus of the target. Next, the CPU extracts a target already present within the traveling prediction course area ECA and a target predicted to enter into the traveling prediction course area ECA in the future and to intersect a tip area TA (see FIGS. 6A and 6B) of the host vehicle, as targets (that is, obstacles) having the possibility of colliding with the host vehicle, based on the traveling prediction course area ECA, a relative relation (relative position and relative speed) between the host vehicle and the target, and the direction of movement of the target with respect to the host vehicle. Here, the tip area TA of the host vehicle is an area indicated by a segment linking the point PL located on the left side by the constant distance αL from the left end of the front end portion of the vehicle body of the host vehicle and the point PR located on the right side by the constant distance αR from the right end of the front end portion of the vehicle body of the host vehicle.

Hereinafter, the process of step 425 will be described in more detail. In a case where a target in front of the host vehicle is detected, the CPU determines whether the target is present with the traveling prediction course area ECA and whether the target enters into the traveling prediction course area ECA in the future and intersects the tip area TA of the host vehicle. In this case, the front of the host vehicle refers to the detection area of the front radar sensor 12C. Specifically, in a case where the position of the target is present within the traveling prediction course area ECA, the CPU determines that the target is present within the traveling prediction course area ECA. Further, in a case where a straight line extending in the direction of movement of the target from the position of the target intersects the traveling prediction course area ECA and the tip area TA of the host vehicle, the CPU determines that the target "enters into the traveling prediction course area ECA in the future and intersects the tip area TA of the host vehicle".

In a case where the CPU determines that the target "is present within the traveling prediction course area ECA or enters into the traveling prediction course area ECA in the future and intersects the tip area TA of the host vehicle", when the camera sensor 11 determines the target to be a pedestrian, the CPU extracts the pedestrian as an obstacle having the possibility of colliding with the host vehicle.

Further, in a case where a target is detected on the front side of the host vehicle, the CPU determines whether the target enters into the traveling prediction course area ECA in the future and intersects the tip area TA of the host vehicle. In this case, the front side of the host vehicle refers to the detection areas of the front-side radar sensor 12L and 12R. Specifically, in a case where a straight line extending in the direction of movement of the target from the position of the target detected on the front side intersects the traveling prediction course area ECA and the tip area TA of the host vehicle, the CPU determines that the target enters into the traveling prediction course area ECA in the future and intersects the tip area TA of the host vehicle. In a case where the CPU determines that the target enters into the traveling prediction course area ECA in the future and intersects the tip area TA of the host vehicle, the CPU extracts the target as an obstacle having the possibility of colliding with the host vehicle without making a distinction of which of a pedestrian, a two-wheeled vehicle, an automobile, and the like the target corresponds to.

Meanwhile, as described above, the CPU estimates the left traveling prediction course LEC as a "course through which the point PL passes which is located further leftward by the constant distance αL from the left end portion of the host vehicle", and estimates the right traveling prediction course REC as a "course through which the point PR passes which is located further rightward by the constant distance αR from the right end portion of the host vehicle". For this reason, the CPU determines that even targets (such as a pedestrian and a two-wheeled vehicle) having the possibility of passing through the vicinity of the left side of the host vehicle or the vicinity of the right side thereof "are present within the traveling prediction course area ECA or enter into the traveling prediction course area ECA in the future and intersect the tip area TA of the host vehicle". Therefore, the CPU can extract even a target having the possibility of passing through the right side or left side of the host vehicle as an obstacle.

As understood from the above, examples of the obstacle extracted in the process of step 425 include a pedestrian present in front of the host vehicle, a moving object approaching so as to intersect the right-left traveling prediction course of the host vehicle from the side of the host vehicle and then intersect the tip area TA of the host vehicle, and a moving object having the possibility of passing through the side of the host vehicle.

Next, the CPU proceeds to step 427, and determines whether an obstacle is extracted in step 425. In a case where an obstacle is not extracted in step 425, vehicle control does not need to be performed. In this case, the CPU makes a determination of "No" in step 427, proceeds to step 495, and temporarily terminate this routine. As a result, vehicle control is not performed.

On the other hand, in a case where an obstacle is extracted in step 425, the CPU makes a determination of "Yes" in step 427, and proceeds to step 430.

Step 430: the CPU calculates the allowance time TTC for each obstacle extracted in the process of step 425. The allowance time TTC (time to collision) is any of the following time T1 and time T2. That is, time T1 (time from the current point in time to a point in time to collision) to reach a point in time at which an obstacle is predicted to collide with the host vehicle and time T2 (time from the current point in time to a point in time of closest approach prediction) to reach a point in time at which an obstacle having the possibility of passing through the side of the host vehicle comes closest to the host vehicle.

The allowance time TTC is calculated by dividing a distance (relative distance) between the host vehicle and an obstacle by the speed (relative speed) of the obstacle with respect to the host vehicle. That is, in a case where the obstacle and the host vehicle are assumed to move while maintaining the relative speed and the relative direction of movement at the current point in time, the allowance time TTC is a time to be taken until the obstacle reaches the "tip area TA of the host vehicle". Meanwhile, in a case where an obstacle is determined not to reach the tip area TA of the host vehicle when moving based on the direction of movement of the obstacle, the allowance time TTC is set to infinity (in reality, value sufficiently greater than the threshold time T1th).

The allowance time TTC indicates a time for which a driver can operate the host vehicle in order to avoid collision between the host vehicle and an obstacle. That is, the allowance time TTC is a parameter indicating the degree of emergency, and is equivalent to the degree of need of vehicle control (which may hereinafter be called the "degree of vehicle control need"). That is, the degree of vehicle control need becomes larger as the allowance time TTC decreases, and the degree of vehicle control need becomes smaller as the allowance time TTC increases.

Next, the CPU proceeds to step 435, selects an obstacle for which the allowance time TTC is shortest as an obstacle which is a target for processing, and proceeds to step 440. The obstacle which is a target for processing is an obstacle on which processes of step 440 and the subsequent steps are executed.

In step 440, the CPU executes a threshold setting process of setting the threshold (threshold time) T1th used for the obstacle which is a target for processing. In reality, in a case where the CPU proceeds to step 440, the CPU executes a subroutine shown as a flowchart in FIG. 5.

Figure 5:
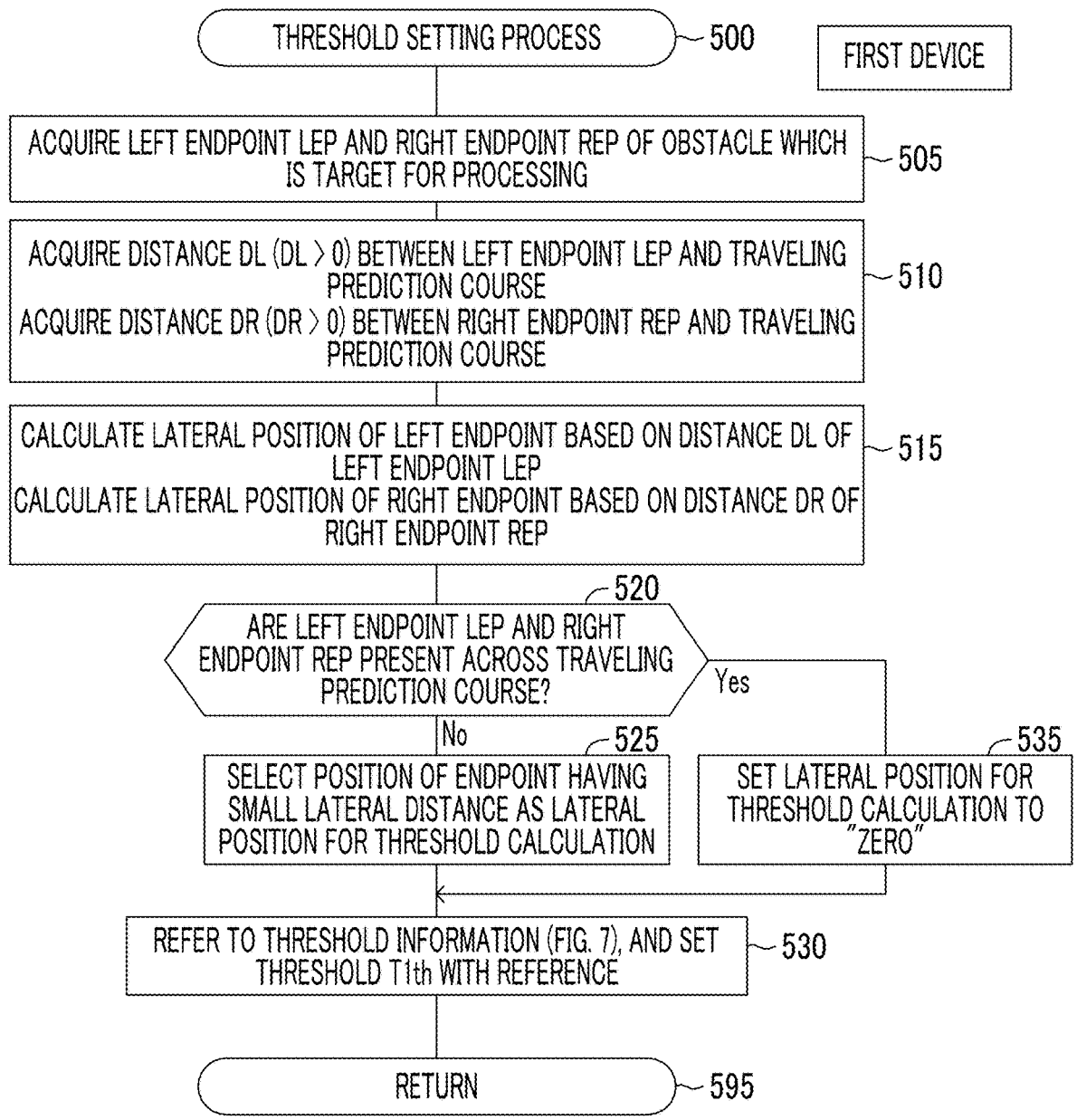
FIG. 5 is a flowchart illustrating a routine which is executed by the CPU of the driving assistance ECU in a threshold setting process of the routine shown in FIG. 4.

That is, in a case where the CPU proceeds to step 440, the CPU starts a process from step 500 of FIG. 5 to proceed to step 505, extracts the left endpoint LEP and the right endpoint REP of the obstacle which is a target for processing, based on information transmitted from the camera sensor 11, and proceeds to step 510. Here, the details of the left endpoint LEP and the right endpoint REP will be described with reference to FIGS. 6A and 6B.

Figure 6A:
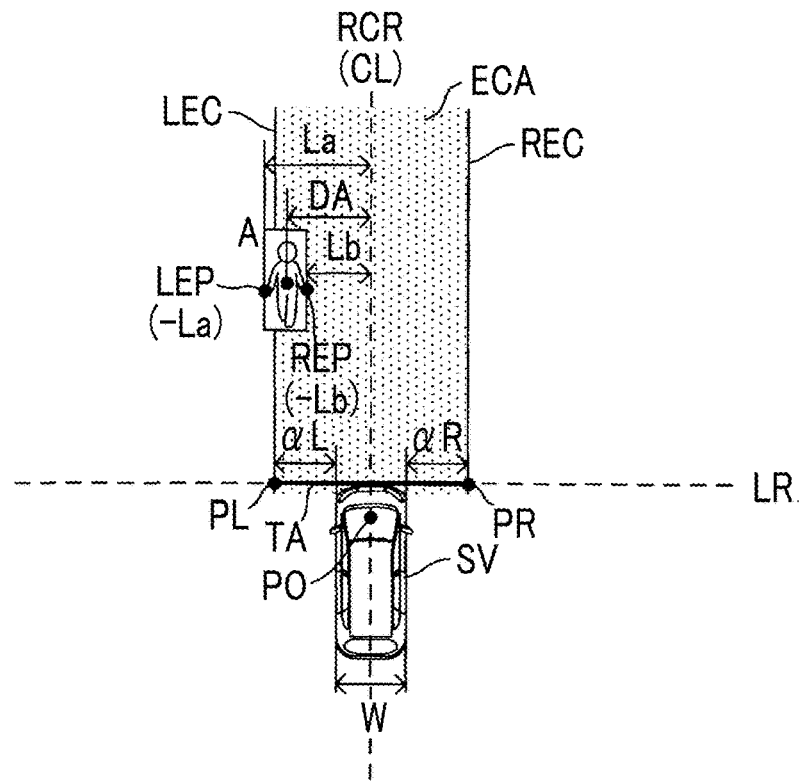
FIG. 6A is a diagram illustrating a positional relationship between a pedestrian (obstacle) having a relatively small lateral width and a host vehicle.

In an example shown in FIG. 6A, since the obstacle which is a target for processing is a pedestrian A, and the host vehicle SV is traveling straight ahead, the traveling prediction course RCR is coincident with the vehicle central line CL. The CPU extracts a point in the image area of the pedestrian A, which is located on the leftmost side in a direction LR perpendicular to the traveling prediction course RCR (vehicle central line CL), as the left endpoint LEP. Further, the CPU extracts (specifies) a point in the image area of the pedestrian A, which is located on the rightmost side in the direction LR perpendicular to the traveling prediction course RCR, as the right endpoint REP. Meanwhile, since the traveling prediction course RCR in a case where the host vehicle SV is traveling straight ahead is coincident with the vehicle central line CL, the direction LR perpendicular to the traveling prediction course RCR is a vehicle-width direction. In an example shown in FIG. 6B, the obstacle which is a target for processing is a pedestrian B. In a case of the example shown in FIG. 6B, similarly to a case of the example shown in FIG. 6A, the left endpoint LEP and the right endpoint REP of the pedestrian B are extracted (specified).

Next, the CPU proceeds to step 510, acquires a distance (left endpoint distance) DL between the left endpoint LEP and the traveling prediction course RCR, and calculates a distance (right endpoint distance) DR between the right endpoint REP and the traveling prediction course RCR. Both the left endpoint distance DL and the right endpoint distance DR are values equal to or greater than "0". In this case, the CPU calculates the left endpoint distance DL and the right endpoint distance DR from information relating to the positions of the left endpoint LEP and the right endpoint REP received from the camera sensor 11.

Next, the CPU proceeds to step 515, and calculates the position (lateral position, lateral coordinates) of the left endpoint LEP with respect to the traveling prediction course RCR, based on the left endpoint distance DL calculated in step 510. Further, the CPU calculates the position (lateral position, lateral coordinates) of the right endpoint REP with respect to the traveling prediction course RCR, based on the right endpoint distance DR calculated in step 510. Specifically, the lateral position of an endpoint located in the left area of the traveling prediction course RCR is set to have a negative value, and the lateral position of an endpoint located in the right area of the traveling prediction course RCR is set to have a positive value. That is, the lateral position of the left endpoint LEP is "−DL" in a case where the left endpoint LEP is located in the left area of the traveling prediction course RCR, and is "DL" in a case where the left endpoint LEP is located in the right area of the traveling prediction course RCR. The lateral position of the right endpoint REP is "−DR" in a case where the right endpoint REP is located in the left area of the traveling prediction course RCR, and is "DR" in a case where the right endpoint REP is located in the right area of the traveling prediction course RCR. Meanwhile, in a case where each endpoint is located on the traveling prediction course RCR, the lateral position of each endpoint is set to have "0".

Next, the CPU proceeds to step 520, and determines whether the "left endpoint LEP and the right endpoint REP" of the obstacle which is a target for processing extracted in step 505 are present (located) across the traveling prediction course RCR. A case where the left endpoint LEP and the right endpoint REP are present across the traveling prediction course RCR refers to a case where the left endpoint LEP of the obstacle which is a target for processing is located in the left area of the traveling prediction course RCR, and the right endpoint REP of the obstacle which is a target for processing is located in the right area of the traveling prediction course RCR. For this reason, in step 520, the CPU determines whether the lateral position of the left endpoint LEP of the obstacle which is a target for processing has a negative value, and the lateral position of the right endpoint REP thereof has a positive value.

In a case where the left endpoint LEP and the right endpoint REP of the obstacle which is a target for processing are not present across the traveling prediction course RCR, the CPU makes a determination of "No" in step 520 and proceeds to step 525. A case where the left endpoint LEP and the right endpoint REP of the obstacle which is a target for processing are not present across the traveling prediction course RCR refers to, that is, a case where the left endpoint LEP and the right endpoint REP of the obstacle which is a target for processing are present in just one area out of the left area and the right area of the traveling prediction course RCR. In step 525, the CPU selects the lateral position of an endpoint having a smaller distance (lateral distance) to the traveling prediction course RCR out of the left endpoint LEP and the right endpoint REP, as a lateral position for threshold calculation, and proceeds to step 530.

Figure 7:
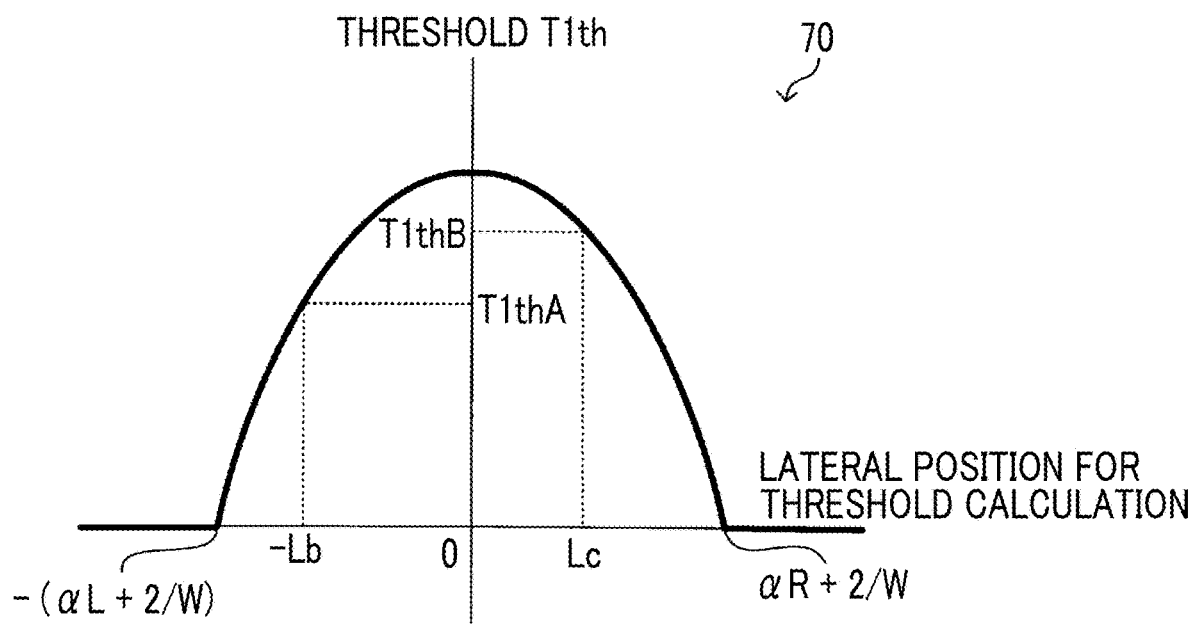
FIG. 7 is a diagram illustrating threshold information.

In step 530, the CPU refers to threshold information 70 shown in FIG. 7 to set a threshold corresponding to the lateral position for threshold calculation selected in step 525 as the threshold T1th with respect to the obstacle which is a target for processing. The CPU proceeds to step 595, temporarily terminate this routine, and proceeds to step 445.

Here, the details of the threshold information 70 will be described with reference to FIG. 7. The threshold information 70 is stored in the ROM of the driving assistance ECU 10 in a look-up table (map) format. The threshold information 70 prescribes a relationship between the lateral position for threshold calculation and the threshold T1th. In the threshold information 70, the threshold T1th is set to have a positive value, and to increase as the lateral position for threshold calculation comes closer to "0". That is, with the threshold information 70, the threshold T1th is set to increase as the absolute value (that is, "distance (lateral distance) between the endpoint out of the left endpoint and the right endpoint which is closer to the traveling prediction course RCR and the traveling prediction course RCR") of the lateral position for threshold calculation decreases. Therefore, the threshold T1th is set to increase as an endpoint closest to the traveling prediction course RCR of the obstacle which is a target for processing comes closer to the traveling prediction course RCR. On the other hand, according to "processes of step 445 and step 450 in FIG. 4" described later, when the allowance time TTC is equal to or less than the threshold T1th, a specific condition in which vehicle control is performed is established, and vehicle control is executed. Therefore, as the endpoint closest to the traveling prediction course RCR of the obstacle which is a target for processing becomes closer to the traveling prediction course RCR, the specific condition in which vehicle control is performed has more of a tendency to be early established, and the execution timing of vehicle control with respect to the obstacle which is a target for processing becomes earlier.

Further, with the threshold information 70, in a case where the lateral position for threshold calculation is equal to or greater than the "value obtained by adding half (W/2) of the vehicle width W to the distance αR", and a case where the lateral position for threshold calculation is equal to or less than the "value obtained by inverting the sign of the value obtained by adding half (W/2) of the vehicle width W to the distance αL", the threshold T1th is set to "0". Therefore, in a case where both the "left endpoint LEP and the right endpoint REP" of the obstacle which is a target for processing are present further rightward than the traveling prediction course RCR, and the lateral distance DL of the left endpoint LEP is equal to or greater than the "value obtained by adding half (W/2) of the vehicle width W to the distance αR", the threshold T1th is set to "0". In this case, since the allowance time TTC inevitably becomes greater than the threshold T1th ("0"), vehicle control is not performed. Similarly, in a case where both the "left endpoint LEP and the right endpoint REP" of the obstacle which is a target for processing are present further leftward than the traveling prediction course RCR, and the lateral distance DR of the right endpoint REP is equal to or greater than the "value obtained by adding half (W/2) of the vehicle width W to the distance αL", the threshold T1th is set to "0". In this case, likewise, since the allowance time TTC inevitably becomes greater than the threshold T1th ("0"), vehicle control is not performed.

Referring back to step 520 shown in FIG. 5, the description of the routine shown in FIG. 5 will be continued. In a case where the "left endpoint LEP and the right endpoint REP" of the obstacle which is a target for processing are located across the traveling prediction course RCR (that is, a case where the left endpoint LEP is located on the left side of the traveling prediction course RCR, and the right endpoint REP is located on the right side of the traveling prediction course RCR), the CPU makes a determination of "Yes" in step 520, and proceeds to step 535. In step 535, the CPU sets the lateral position for threshold calculation to "0", and proceeds to step 530. In step 530, the CPU refers to the threshold information 70 to set the threshold T1th corresponding to the lateral position for threshold calculation "0" set in step 535, proceeds to step 595, temporarily terminates this routine, and proceeds to step 445 of FIG. 4. As a result, the threshold T1th is set to a maximum value.

Here, in a case where the left endpoint LEP and the right endpoint REP are located across the traveling prediction course RCR, similarly to a case where the left endpoint LEP and the right endpoint REP are not located across the traveling prediction course RCR, it is assumed that the CPU proceeds to step 525. In this case, the CPU selects the lateral position of an endpoint closest to the traveling prediction course RCR as the lateral position for threshold calculation, and sets the threshold T1th corresponding to the lateral position for threshold calculation.

However, in a case where the left endpoint LEP and the right endpoint REP are located across the traveling prediction course RCR, the obstacle which is a target for processing is located on the traveling prediction course RCR, and thus it is considered that the possibility of colliding with the host vehicle is highest. Thus, the timing of vehicle control is set to an earliest timing, irrespective of the positions of the left endpoint LEP and the right endpoint REP. In other words, the lateral position for threshold calculation is set to "0", and thus the threshold T1th is set to have a maximum value. In the above-described assumption, a threshold T1th is set to be smaller than the threshold T1th to be set originally, and the execution timing of vehicle control with respect to the obstacle which is a target for processing becomes later than the original execution timing.

Consequently, in the present embodiment, in a case where the CPU makes a determination of "Yes" in step 520, the CPU proceeds to step 535, and sets the lateral position for threshold calculation to "0". Thereby, in a case where the left endpoint LEP and the right endpoint REP are located across the traveling prediction course RCR, the lateral position for threshold calculation "0" to be set originally is set, whereby a maximum threshold T1th is set. Thereby, vehicle control is performed at an original appropriate timing on the obstacle which is a target for processing located on the traveling prediction course RCR.

In a case where the CPU sets the threshold T1th in step 440 of FIG. 4 as described above, and then proceeds to step 445, the CPU determines whether the allowance time TTC for the obstacle which is a target for processing is equal to or less than the threshold T1th set in step 440.

In a case where the allowance time TTC for the obstacle which is a target for processing is equal to or less than the threshold T1th, the CPU makes a determination of "Yes" in step 445, and proceeds to step 450. In step 450, the CPU executes display control for displaying a first attention-attracting screen 80 (see FIG. 8) for guiding a driver's eyes in a direction in which the obstacle which is a target for processing is present, on the indicator 14, as one of pieces of vehicle control performed on the obstacle which is a target for processing. Thereafter, the CPU proceeds to step 495, and temporarily terminates this routine.

Here, the details of the first attention-attracting screen 80 will be described with reference to FIG. 8. The display area of the indicator 14 is provided in an area in front of a driver's seat of the windshield of the host vehicle. The central line of the display area is shown by a dashed-dotted line in FIG. 8 (the same is true of FIG. 11). The central line is shown for convenience for description, but is not displayed in an actual display area. The central line of the display area corresponds to the vehicle central line CL. An area located further leftward than the central line of the display area corresponds to a left area around the front of the host vehicle, and an area located further rightward than the central line of the display area corresponds to a right area around the front of the host vehicle.

In the first attention-attracting screen 80, a visual guidance icon 81 for guiding a driver's eyes is displayed in the direction of the obstacle which is a target for processing. Meanwhile, in the present specification, the visual guidance icon may be called a display element or a visual guidance mark, regardless of the type thereof.

The visual guidance icon 81 has a shape in which three circular arcs are lined up in a row. The visual guidance icon 81 is radially displayed in a range of ±90 deg in a right-left direction centering on a predetermined position P0 on the central line of the display area. The arc lengths of the three circular arcs decrease with increasing distance from the predetermined position P0. The three circular arcs are turned on in order from an arc close to the position P0 (the same is true of other visual guidance icons). The visual guidance icon 81 can be displayed in units of angles (12 deg) obtained by dividing, into fifteen parts, an angular range (180 deg) from a straight line extending to the right side from the position P0 among horizontal lines perpendicular to the central line to a straight line extending to the left side from the position P0 among the horizontal lines. In FIG. 8 (the same is true of FIG. 11), positions (axis lines) capable of being displayed by the visual guidance icon 81 are shown by dotted lines, but the dotted lines are not displayed in an actual display area.

Figure 8:
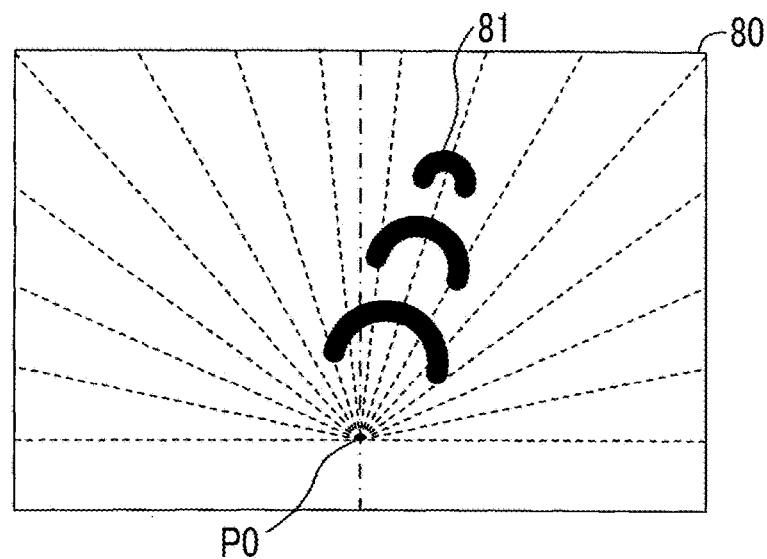
FIG. 8 is a diagram illustrating a first attention-attracting screen.

In an example shown in FIG. 8, the visual guidance icon 81 indicates a direction of 18 deg to the right side from the central line of the display area, and shows that an obstacle which is a target for processing is present in the direction. A driver's eyes are guided in a direction indicated by the visual guidance icon 81, and thus the driver performs attention attraction on the obstacle which is a target for processing. When the CPU proceeds to step 450 of FIG. 4, the CPU determines a direction indicated by the visual guidance icon 81 based on the direction (orientation) of the obstacle which is a target for processing, and transmits a display command to the indicator (HUD) 14 so that the visual guidance icon 81 is displayed along the direction.

Referring back to step 445 shown in FIG. 4, the description of the routine shown in FIG. 4 will be continued. In a case where the allowance time TTC for the obstacle which is a target for processing is greater than the threshold T1th, the CPU makes a determination of "No" in step 445, proceeds to step 495, and temporarily terminates this routine. As a result, in a case where the allowance time TTC for the obstacle which is a target for processing is greater than the threshold T1th, the first attention-attracting screen 80 is not displayed. That is, in this case, vehicle control is not performed.

On the other hand, in a case where the host vehicle is turning, the CPU proceeds to step 420 to make a determination of "Yes" in step 420, and proceeds to step 455. In step 455, while maintaining a distance between the traveling prediction course RCR and the target and a distance between the target and the host vehicle SV in a case where it is assumed that the host vehicle SV travels along the traveling prediction course RCR, the CPU performs coordinate transformation on the coordinates of each target so that the traveling prediction course RCR is coincident with the vehicle central line CL, and proceeds to step 425.

Figure 9:
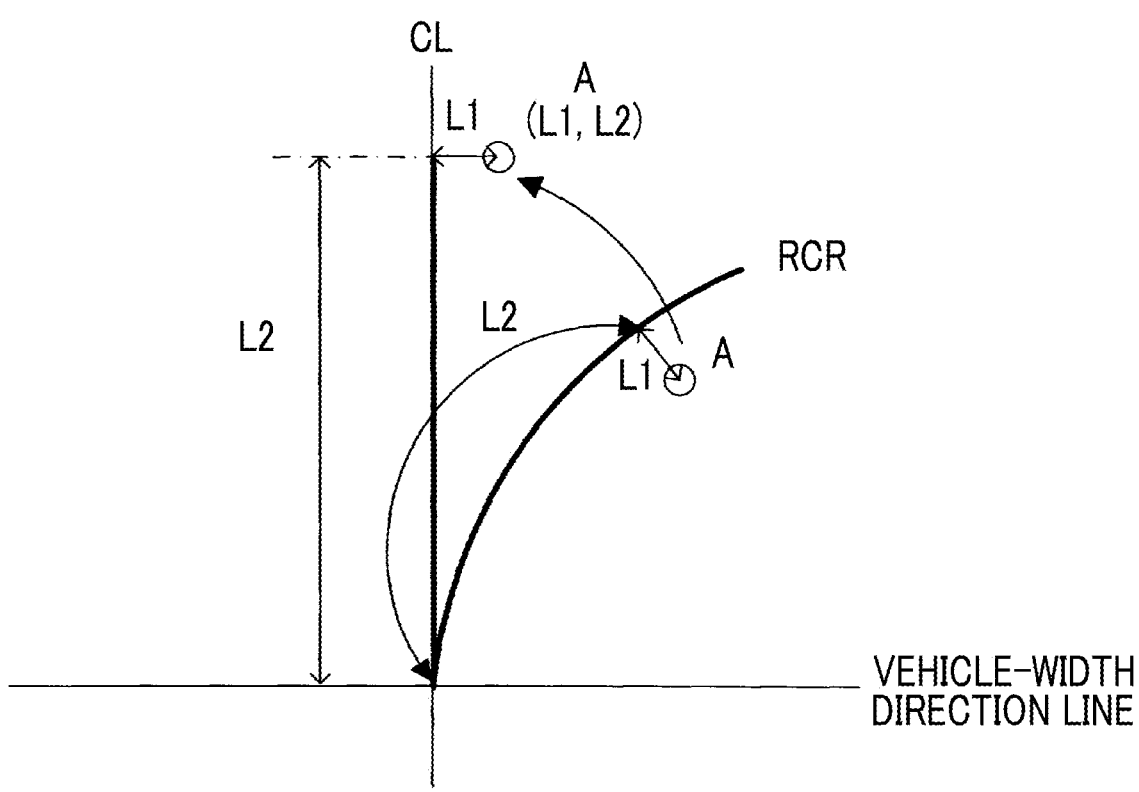
FIG. 9 is a diagram illustrating coordinate transformation for making a traveling prediction course in a case where a vehicle is turning coincident with a vehicle central line.

The details of step 455 will be described with reference to FIG. 9. In FIG. 9, a distance between the traveling prediction course RCR and a target A is "L1". Further, a distance between the target A and the host vehicle SV in a case where it is assumed that the host vehicle SV travels along the traveling prediction course RCR is "L2". The "distance between the target A and the host vehicle SV in a case where it is assumed that the host vehicle SV travels along the traveling prediction course RCR" is, in other words, a "distance (road distance) along the traveling prediction course RCR from the host vehicle SV to a point closest to the target A in the traveling prediction course RCR".

In this manner, coordinate transformation is performed on the coordinates of the target A so that the traveling prediction course RCR is coincident with the vehicle central line CL while maintaining the distance "L1" between the traveling prediction course RCR and the target A and the distance "L2" between the target A and the host vehicle SV in a case where it is assumed that the host vehicle SV travels along the traveling prediction course RCR. For this reason, a distance between the target A and the vehicle central line CL after coordinate transformation is set to L1, and a distance between the target A and the host vehicle SV after coordinate transformation is set to "L2". Therefore, the coordinates of the target A after coordinate transformation in a coordinate system in which the vehicle-width direction is set to an x-axis and the vehicle central line is set to a y-axis are set to (L1,L2).

Subsequently, the CPU executes processes of step 425 and the subsequent steps using the coordinates of the target after coordinate transformation.

A process (step 425 in FIG. 4) in which an obstacle is extracted from the target on which coordinate transformation is performed will be described below. In step 425, the CPU also performs coordinate transformation on the past position coordinates of the target on which coordinate transformation is performed in step 455. More specifically, the CPU performs coordinate transformation on the position coordinates of the past target so that the traveling prediction course RCR is coincident with the vehicle central line CL, similarly to step 455, while maintaining a distance between the traveling prediction course RCR estimated this time and the past target and a distance between the past target and the host vehicle SV in a case where it is assumed that the host vehicle SV travels along the traveling prediction course RCR estimated this time.

The CPU calculates the movement locus of the target based on the coordinates of the target after coordinate transformation, and calculates the direction of movement of the target based on the calculated movement locus of the target. Thereby, the direction of movement of the target in a coordinate system after coordinate transformation is calculated. The CPU extracts a target already present in the traveling prediction course area ECA and a target predicted to enter into the traveling prediction course area ECA in the future and to intersect the tip area TA of the host vehicle, as obstacles, based on the traveling prediction course area ECA based on the traveling prediction course RCR made to be coincident with the vehicle central line CL, a relative relation (relative position after coordinate transformation and relative speed after coordinate transformation) between the host vehicle and the target after coordinate transformation, and the direction of movement of the target after coordinate transformation with respect to the host vehicle.

Further, in step 430, the CPU calculates the allowance time TTC by dividing a distance between the host vehicle and the obstacle specified from the position of the obstacle after coordinate transformation with respect to the host vehicle by the speed of the obstacle relative to the host vehicle based on the direction of movement calculated based on the movement locus of the past obstacle after coordinate transformation.

The details of a threshold setting process using the coordinates of the target after coordinate transformation will be described below. In step 505, the CPU extracts the left endpoint LEP and the right endpoint REP of the obstacle which is a target for processing after coordinate transformation. The left endpoint LEP is a point located on the leftmost side of the obstacle which is a target for processing after coordinate transformation in a direction perpendicular to the vehicle central line CL. The left endpoint LEP of the obstacle which is a target for processing after coordinate transformation is a point located on the leftmost side of the obstacle which is a target for processing before coordinate transformation in a direction perpendicular to the traveling prediction course RCR of the obstacle. Meanwhile, the direction perpendicular to the traveling prediction course RCR refers to a direction perpendicular to the tangential line of the traveling prediction course RCR at a point closest to the obstacle which is a target for processing on the traveling prediction course RCR.

Similarly, the right endpoint REP is a point located on the rightmost side of the obstacle which is a target for processing after coordinate transformation in a direction perpendicular to the vehicle central line CL. The right endpoint REP of the obstacle which is a target for processing after coordinate transformation is a point located on the rightmost side of the obstacle which is a target for processing before coordinate transformation in a direction perpendicular to the traveling prediction course RCR.

Therefore, the left endpoint LEP and the right endpoint REP of the obstacle which is a target for processing which are extracted in step 505 may refer to a point located on the leftmost side of the obstacle which is a target for processing after coordinate transformation and a point located on the rightmost side thereof in a direction perpendicular to the traveling prediction course RCR.

In step 510, the CPU calculates lateral distances between the vehicle central line CL and the left endpoint LEP and the right endpoint REP of the obstacle which is a target for processing after coordinate transformation which are extracted in step 505. The lateral distance corresponds to a lateral distance between the traveling prediction course RCR and each of the "left endpoint LEP and the right endpoint REP" of the obstacle which is a target for processing before coordinate transformation. Further, in step 515, the CPU calculates lateral positions of the left endpoint LEP and the right endpoint REP of the obstacle which is a target for processing after coordinate transformation which are extracted in step 505 with respect to the vehicle central line CL. The lateral position corresponds to a lateral position of each of the left endpoint LEP and the right endpoint REP of the obstacle which is a target for processing before coordinate transformation with respect to the traveling prediction course RCR before coordinate transformation.

Meanwhile, processes of step 520 and the subsequent steps are the same as those in a case where the host vehicle SV is not turning, and thus the description thereof will not be given.

As described above, in a case where the host vehicle SV is turning, the CPU performs the above-described coordinate transformation and then calculates a lateral position for threshold calculation. Thereby, since the lateral position for threshold calculation is calculated in accordance with the traveling prediction course RCR along which the host vehicle SV travels in reality, a more accurate threshold T1th is set in a case where the host vehicle SV is turning. Therefore, it is possible to perform vehicle control at an appropriate timing.

Next, a threshold setting process for the pedestrian (obstacle) A and the pedestrian (obstacle) B who have different lateral widths will be described using an example. Here, it is assumed that conditions described below are entirely established between the pedestrian A shown in FIG. 6A and the pedestrian B shown in FIG. 6B. Further, it is assumed that the host vehicle SV is not turning and is traveling straight ahead. Therefore, the traveling prediction course RCR of the host vehicle is the central line CL. The lateral width of the pedestrian A is smaller than the lateral width of the pedestrian B. Both the central position of the pedestrian A and the central position of the pedestrian B are present within the traveling prediction course area ECA. A distance DA between the central position of the pedestrian A and the traveling prediction course RCR and a distance DB between the central position of the pedestrian B and the traveling prediction course RCR are equal to each other. The allowance time TTC for the pedestrian A and the allowance time TTC for the pedestrian B are equal to each other.

The pedestrian A shown in FIG. 6A is present within the traveling prediction course area ECA, and thus the pedestrian A is extracted as an obstacle in step 425. Further, in a case where it is assumed that targets other than the pedestrian A are not detected, the allowance time TTC (time to be taken until the pedestrian A comes closest to the host vehicle SV) for the pedestrian A is shortest among obstacles. For this reason, in step 435, the pedestrian A is selected as an obstacle which is a target for processing.

In step 505, the left endpoint LEP which is a point located on the leftmost side of the pedestrian A and the right endpoint REP which is a point located on the rightmost side thereof are acquired in the direction (vehicle-width direction) LR perpendicular to the traveling prediction course RCR (vehicle central line CL). Further, in step 510, the left endpoint distance DL is calculated. As a result, the left endpoint distance DL is obtained as a distance "La". Further, in step 510, the right endpoint distance DR is calculated. As a result, the right endpoint distance DR is obtained as a distance "Lb". Since both the left endpoint LEP and the right endpoint REP of the pedestrian A are located further leftward than the traveling prediction course RCR, in step 515, the lateral position of the left endpoint LEP is calculated to be "−La", and the lateral position of the right endpoint REP is calculated to be "−Lb".

Both the left endpoint LEP and the right endpoint REP of the pedestrian A are located further leftward than the traveling prediction course RCR, and thus are not present across the traveling prediction course RCR. Further, the lateral distance "Lb" of the right endpoint REP is smaller than the lateral distance "La" of the left endpoint LEP. Therefore, in step 525, the lateral position "−Lb" of the right endpoint REP of the pedestrian A is selected as a lateral position for threshold calculation. As a result, in step 530, the threshold T1th is set as a threshold T1thA corresponding to the lateral position for threshold calculation "−Lb", based on the threshold information 70 shown in FIG. 7.

Figure 6B:
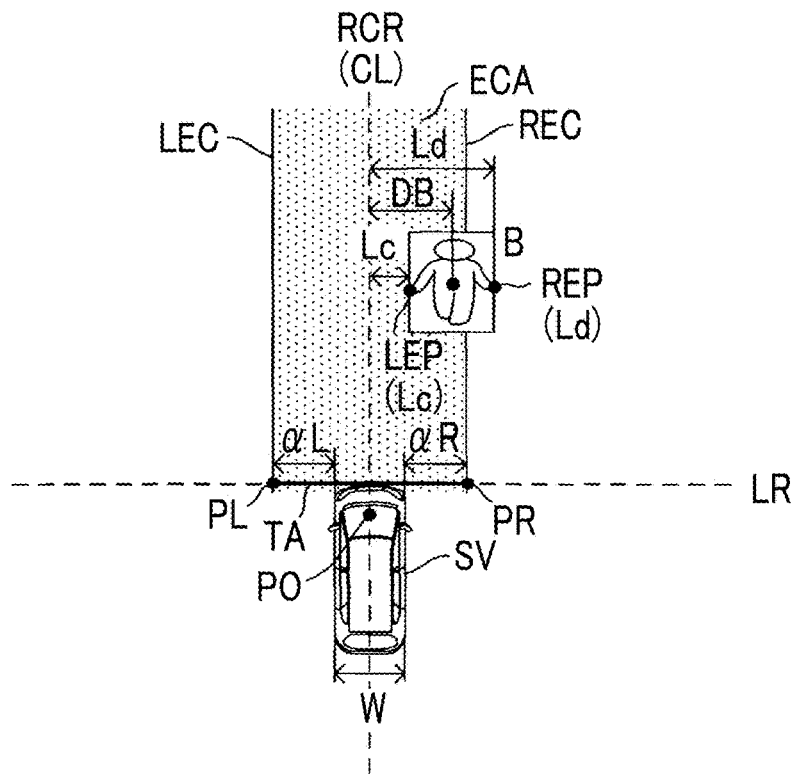
FIG. 6B is a diagram illustrating a positional relationship between a pedestrian (obstacle) having a relatively large lateral width and the host vehicle.

Since the pedestrian B shown in FIG. 6B is also present within the traveling prediction course area ECA, the pedestrian B is extracted as an obstacle in step 425. Further, in a case where it is assumed that targets other than the pedestrian B are not detected, the allowance time TTC (time to be taken until the pedestrian B comes closest to the host vehicle SV) for the pedestrian B is shortest among obstacles. For this reason, in step 435, the pedestrian B is selected as an obstacle which is a target for processing.

In step 505, the left endpoint LEP which is a point located on the leftmost side of the pedestrian B and the right endpoint REP which is a point located on the rightmost side thereof are acquired in the direction (vehicle-width direction) LR perpendicular to the traveling prediction course RCR (vehicle central line CL). Further, in step 510, the left endpoint distance DL is calculated. As a result, the left endpoint distance DL is obtained as a distance "Lc". Further, in step 510, the right endpoint distance DR is calculated. As a result, the right endpoint distance DR is obtained as a distance "Ld". Since both the left endpoint LEP and the right endpoint REP of the pedestrian B are located rightward than the traveling prediction course RCR, in step 515, the lateral position of the left endpoint LEP is calculated to be "Lc", and the lateral position of the right endpoint REP is calculated to be "Ld".

Both the left endpoint LEP and the right endpoint REP of the pedestrian B are located rightward than the traveling prediction course RCR, and thus are not present across the traveling prediction course RCR. Further, the lateral distance "Lc" of the left endpoint LEP is smaller than the lateral distance "Ld" of the right endpoint REP. Therefore, in step 525, the lateral position "Lc" of the left endpoint LEP of the pedestrian B is selected as a lateral position for threshold calculation. As a result, in step 530, the threshold T1th is set as a threshold T1thB corresponding to the lateral position for threshold calculation "Lc", based on the threshold information 70 shown in FIG. 7.

Incidentally, according to the above assumption, the distance DA between the central position of the pedestrian A and the traveling prediction course RCR and a distance DB between the central position of the pedestrian B and the traveling prediction course RCR are equal to each other, but the lateral width of the pedestrian A is smaller than the lateral width of the pedestrian B. For this reason, the lateral distance "Lc" of the lateral position for threshold calculation "Lc" of the pedestrian B is smaller than the lateral distance "Lb" of the lateral position for threshold calculation "−Lb" of the pedestrian A. For this reason, the threshold T1thB set in the pedestrian B is greater than the threshold T1thA set in the pedestrian A. Therefore, the execution timing of vehicle control (attention attraction in the present example) with respect to the pedestrian B becomes earlier than the execution timing of vehicle control with respect to the pedestrian A.

As understood from the above example, the first device can set the threshold T1th so as to advance the execution timing of vehicle control with respect to an obstacle including an endpoint closer to the traveling prediction course RCR, that is, an obstacle having a higher possibility of colliding with the host vehicle SV. Therefore, it is possible to perform vehicle control at a more appropriate timing.

Second Embodiment

Next, a driving assistance device (which may hereinafter be called a "second device") according to a second embodiment of the present disclosure will be described. The second device is different from the first device, in solely that all the obstacles extracted in step 425 are selected as obstacles which are targets for processing. Hereinafter, a description will be given with a focus on this difference.

Figure 10:
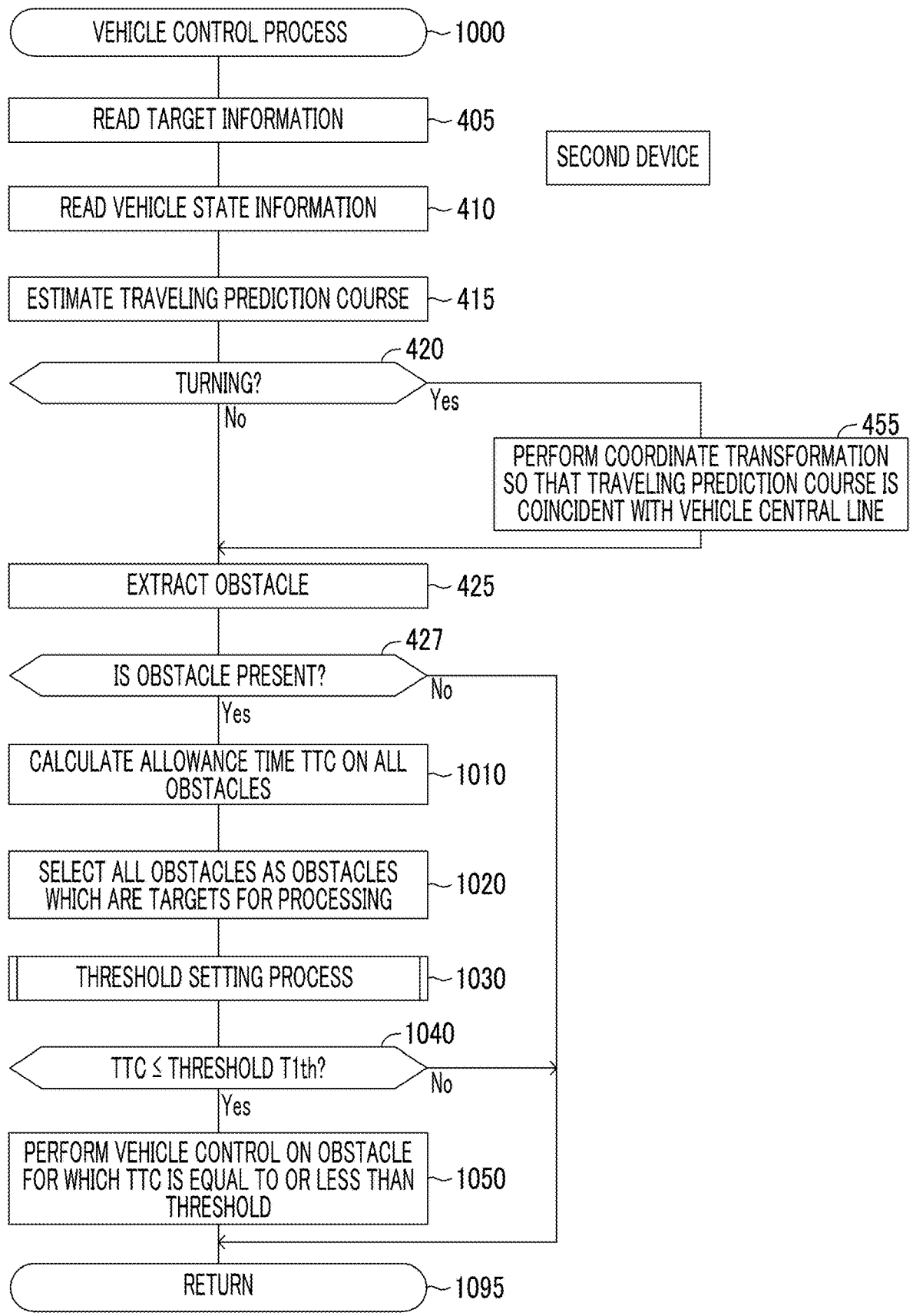
FIG. 10 is a flowchart illustrating a routine which is executed by the CPU of a driving assistance device according to a second embodiment of the present disclosure.

The CPU of the second device executes a routine shown in FIG. 10 whenever a predetermined time elapses, instead of the routine shown in FIG. 4. Steps of performing the same processes as those in the steps shown in FIG. 4 among steps shown in FIG. 10 are assigned the same numerals and signs as those assigned to such steps of FIG. 4. The detailed description of these steps will not be given.

In a case of arrival at a predetermined timing, the CPU starts a process from step 1000 of FIG. 10, and performs processes of step 405 to step 415 in order. As a result, the traveling prediction course RCR is estimated.

Next, the CPU determines whether the host vehicle is turning in step 420. In a case where the host vehicle is not turning, the CPU makes a determination of "No" in step 420, executes the process of step 425, and proceeds to step 427. On the other hand, in a case where the host vehicle is turning, the CPU makes a determination of "Yes" in step 420, executes processes of step 455 and step 425 in order, and proceeds to step 427. Further, in a case where an obstacle is not extracted in step 425, the CPU makes a determination of "No" in step 427, proceeds to step 1095, and temporarily terminates this routine. In a case where an obstacle is extracted in step 425, the CPU makes a determination of "Yes" in step 427, performs processes of step 1010 to step 1030 described below in order, and proceeds to step 1040.

Step 1010: the CPU calculates the allowance time TTC for each of all the obstacles extracted in step 425.

Step 1020: the CPU selects all the obstacles extracted in step 425 as obstacles which are targets for processing.

Step 1030: the CPU executes the routine shown in FIG. 5 with respect to each of the obstacles which are targets for processing selected in step 1020, and thus sets the threshold T1th with respect to each of the obstacles which are targets for processing.

In a case where the CPU proceeds to step 1040, the CPU determines whether the allowance time TTC for each of the obstacles which are targets for processing is equal to or less than the threshold T1th set with respect to each of the obstacles which are targets for processing. Further, in step 1040, the CPU determines whether at least one obstacle which is a target for processing for which the allowance time TTC is equal to or less than the threshold T1th is present.

In a case where the CPU determines that at least one obstacle which is a target for processing for which the allowance time TTC is equal to or less than the threshold T1th is present, the CPU makes a determination of "Yes" in step 1040, and proceeds to step 1050. In step 1050, the CPU performs vehicle control (in this case, attention attraction using the indicator 14) on the obstacle which is a target for processing for which the allowance time TTC is equal to or less than the threshold T1th, proceeds to step 1095, and temporarily terminates this routine. On the other hand, in a case where the CPU determines that the obstacle which is a target for processing for which the allowance time TTC is equal to or less than the threshold T1th is not present, the CPU makes a determination of "No" in step 1040, proceeds to step 1095, and temporarily terminates this routine. As a result, vehicle control is not performed.

Here, the description of a process of step 1050 is added. In a process of step 1040, in a case where the CPU determines that there is one obstacle which is a target for processing for which the allowance time TTC is equal to or less than the threshold T1th, the CPU displays the first attention-attracting screen 80 (see FIG. 8) on the indicator 14. That is, in a case where there is one obstacle which is a target for processing for which the allowance time TTC is equal to or less than the threshold T1th, the first attention-attracting screen 80 is a screen for guiding a driver's eyes in the direction of the obstacle which is a target for processing.

On the other hand, in the process of step 1040, in a case where the CPU determines that there is a plurality of obstacles which is a target for processing for which the allowance time TTC is equal to or less than the threshold T1th, in step 1050, the CPU displays a second attention-attracting screen 110 (see FIG. 11) for guiding a driver's eyes to the entire front of the host vehicle SV on the indicator 14.

Figure 11:
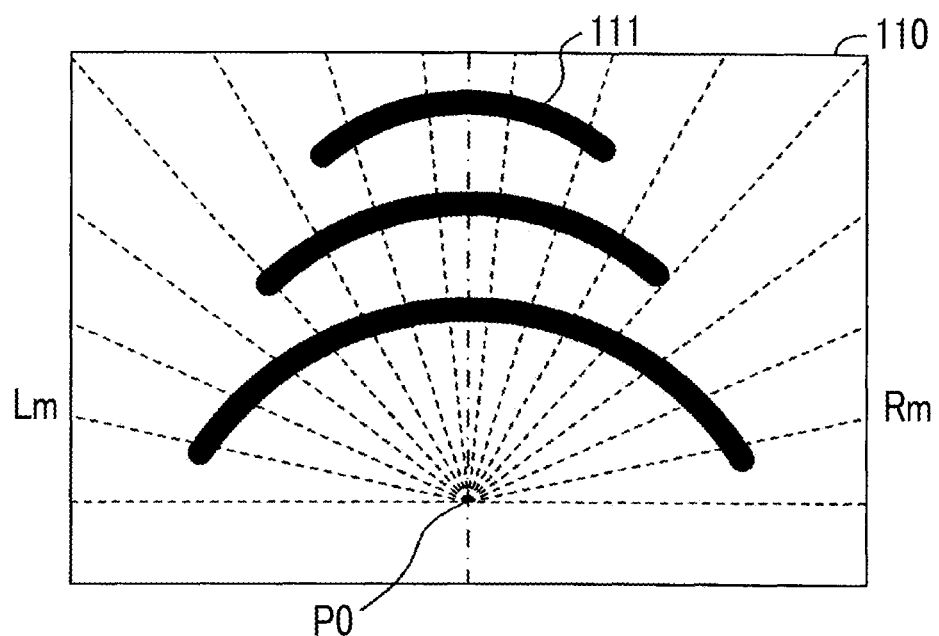
FIG. 11 is a diagram illustrating a second attention-attracting screen.

That is, in the second attention-attracting screen 110 shown in FIG. 11, an entire visual guidance icon 111 for guiding a driver's eyes to the entire area (in a case where a plurality of obstacles is handled as one large object, the direction of the object) in front of the host vehicle is displayed. The entire visual guidance icon 111 has a shape in which three circular arcs are lined up in a row similarly to the visual guidance icon 81, and the arc lengths of the three circular arcs decrease with increasing distance from a predetermined position P0. However, the circular arc of the entire visual guidance icon 111 is different from that of the visual guidance icon 81, in that the circular arc extends throughout substantially the entire area within a driver's eyes. Specifically, a circular arc closest to the position P0 among the circular arcs of the entire visual guidance icon 111 extends from a direction Lm of 78 deg counterclockwise from the central line to a direction Rm of 78 deg clockwise from the central line. Thereby, a driver's eyes are guided toward the entirety of a plurality of obstacles.

In the second attention-attracting screen 110, a plurality of visual guidance icons 81 is not displayed toward a plurality of "obstacles which is a target for processing for which the allowance time TTC is equal to or less than the threshold T1th", and one entire visual guidance icon 111 is displayed. For this reason, it is possible to lower the "possibility that a driver's eyes are guided in a plurality of directions due to a plurality of visual guidance icons 81 for guiding the driver's eyes in the directions of a plurality of obstacles being displayed, to thereby cause the driver's confusion".

As described above, the second device selects all the extracted obstacles as obstacles which are targets for processing, and sets a threshold corresponding to a lateral position for threshold calculation with respect to each obstacle which is a target for processing. Thereby, since appropriate thresholds considering a lateral width can be set with respect to all the obstacles, it is possible to perform vehicle control on each obstacle at an appropriate timing. In addition, since the second device can guide the driver's eyes to all the obstacles which are targets for processing for which the TTC is equal to or less than the threshold, it is possible to realize more suitable driving assistance.

Third Embodiment

Next, a driving assistance device (which may hereinafter be called a "third device") according to a third embodiment of the present disclosure will be described. The third device is different from the first device in a method of selecting an obstacle which is a target for processing. Hereinafter, a description will be given with a focus on this difference. Specifically, the third device calculates the "lateral position with respect to the traveling prediction course RCR" of each obstacle. The third device makes a correction so as to increase the allowance time TTC for each obstacle as the lateral position of each obstacle becomes closer to the traveling prediction course RCR. The third device selects an obstacle for which the allowance time TTC after correction is shortest as an obstacle which is a target for processing.

Figure 12:
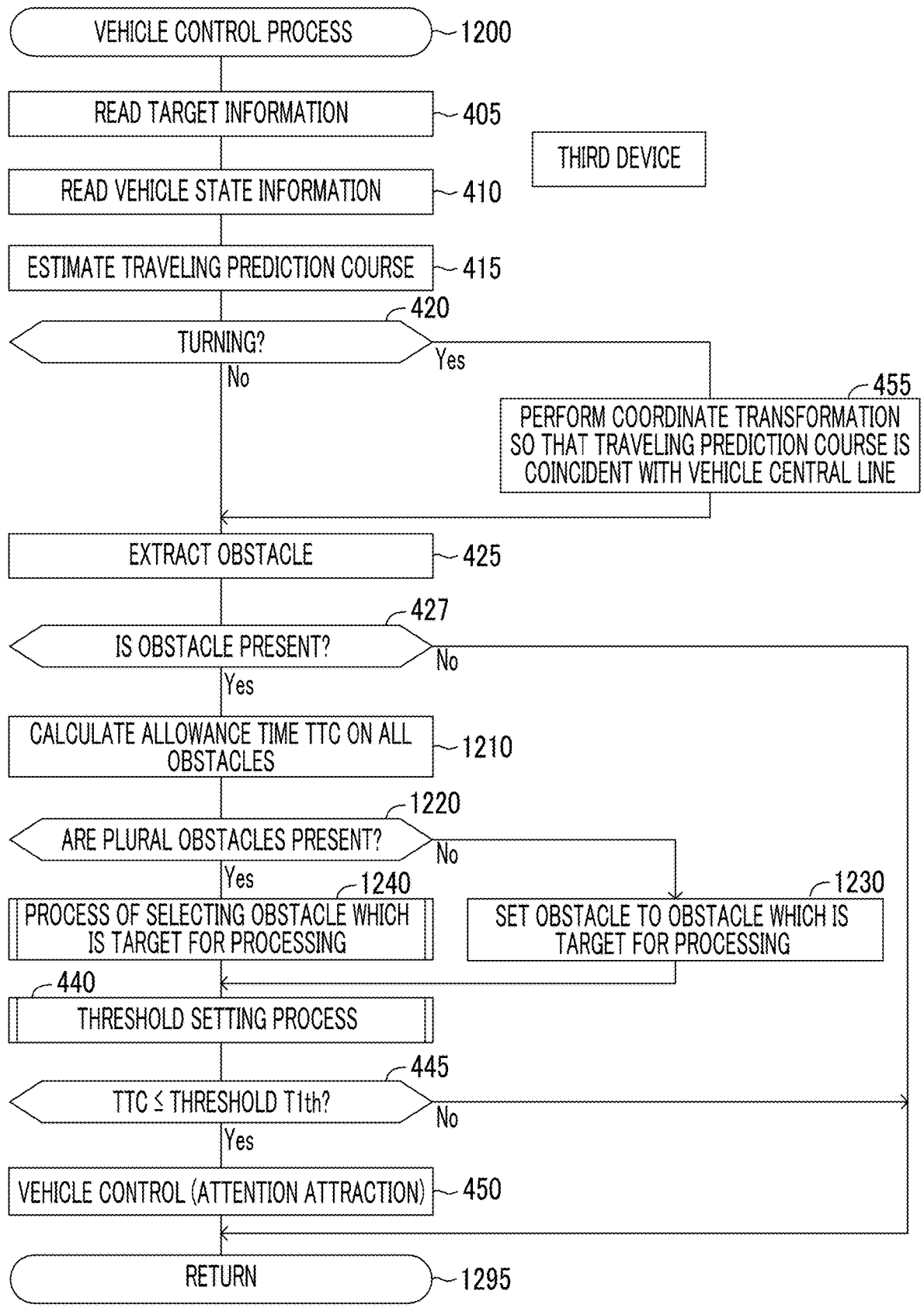
FIG. 12 is a flowchart illustrating a routine which is executed by the CPU of a driving assistance device according to a third embodiment of the present disclosure.

The CPU of the third device executes a routine shown in FIG. 12 whenever a predetermined time elapses, instead of the routine shown in FIG. 4. Steps of performing the same processes as those in the steps shown in FIG. 4 among steps shown in FIG. 12 are assigned the same numerals and signs as those assigned to such steps of FIG. 4. The detailed description of these steps will not be given.

In a case of arrival at a predetermined timing, the CPU starts a process from step 1200 of FIG. 12, and performs processes of step 405 to step 415 in order. As a result, the traveling prediction course RCR is estimated.

Next, the CPU determines whether the host vehicle is turning in step 420. In a case where the host vehicle is not turning, the CPU makes a determination of "No" in step 420, executes the process of step 425, and proceeds to step 427. On the other hand, in a case where the host vehicle is turning, the CPU makes a determination of "Yes" in step 420, executes the processes of step 455 and step 425 in order, and proceeds to step 427. Further, in a case where an obstacle is not extracted in the process of step 425, the CPU makes a determination of "No" in step 427, proceeds to step 1095, and temporarily terminates this routine. In a case where an obstacle is extracted in the process of step 425, the CPU makes a determination of "Yes" in step 427, and proceeds to step 1210.

In step 1210, the CPU calculates the allowance time TTC for each of all the obstacles extracted in step 425. Next, the CPU proceeds to step 1220, and determines whether a plurality of obstacles is extracted in step 425.

In a case where a plurality of obstacles is not extracted in step 425 (that is, in a case where one obstacle is extracted in step 425), the CPU makes a determination of "No" in step 1220, and proceeds to step 1230. In this case, since the CPU determines in step 427 that at least one obstacle is present, just one obstacle is present. In step 1230, the CPU sets the one obstacle extracted in step 425 as an obstacle which is a target for processing, and proceeds to step 440.

On the other hand, in a case where a plurality of obstacles is extracted in step 425, the CPU makes a determination of "Yes" in step 1220, and proceeds to step 1240.

In step 1240, the CPU executes a process of selecting an obstacle which is a target for processing. In reality, in a case where the CPU proceeds to step 1240, the CPU executes a subroutine shown as a flowchart in FIG. 13. The subroutine is a routine for obtaining an allowance time TTCg after correction by making a correction so as to decrease the allowance time TTC as the lateral position with respect to the traveling prediction course RCR decreases, and selecting an obstacle for which the allowance time TTCg after correction is shortest as an obstacle which is a target for processing.

Figure 13:
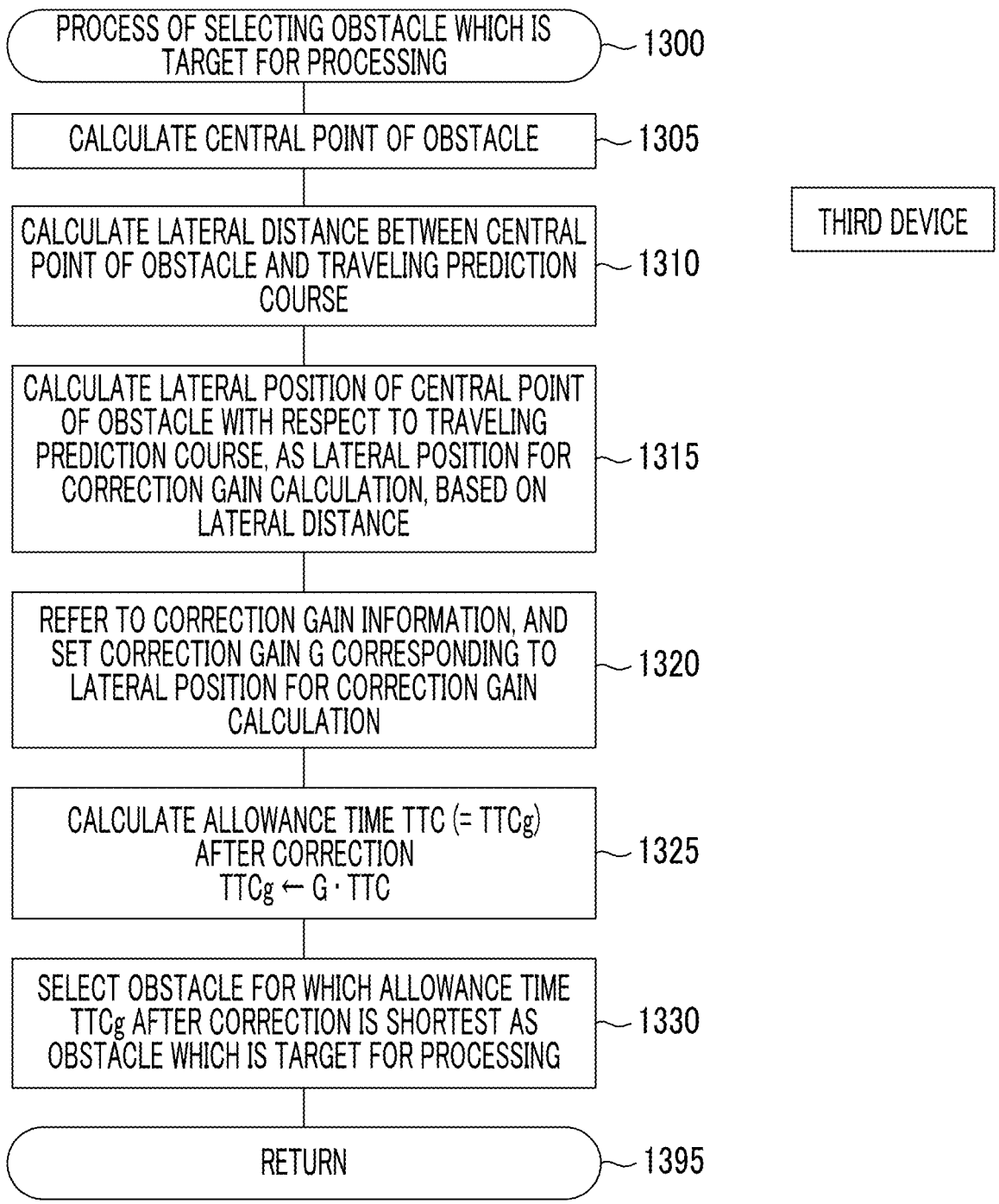
FIG. 13 is a flowchart illustrating a routine which is executed by the CPU of the driving assistance ECU in a process of selecting an obstacle which is a target for processing in the routine shown in FIG. 12.

That is, in a case where the CPU proceeds to step 1240, the CPU starts a process from step 1300 of FIG. 13, performs processes of step 1305 to step 1330 described below in order, and proceeds to step 445 of FIG. 4 through step 1395.

Step 1305: the CPU extracts the central point CP (see FIG. 14) of each obstacle based on the target information which is read in step 405, and proceeds to step 1310. The central point will be described with reference to FIG. 14. The central point CP of each obstacle (pedestrian A and pedestrian B) is a central position the left endpoint LEP and the right endpoint REP of each obstacle in the direction LR perpendicular to the traveling prediction course RCR. For this reason, the CPU extracts the left endpoint LEP and the right endpoint REP of each obstacle in the right-left direction line LR, and extracts a central position between the left endpoint LEP and the right endpoint REP which are extracted in the direction LR perpendicular to the traveling prediction course RCR, as the central point CP of each obstacle.

Step 1310: the CPU calculates a lateral distance between the traveling prediction course RCR and the central point CP of each obstacle extracted in step 1305. Meanwhile, since the radar sensor 12 measures a distance between the central position of the target and the host vehicle and the orientation of the central position of the target with respect to the host vehicle, the CPU may calculate a lateral distance between the central point CP of each obstacle and the traveling prediction course RCR based on the target information received from the radar sensor 12. In this case, the process of step 1305 may be omitted.

Step 1315: the CPU calculates the position (lateral position, lateral coordinates) of the central point CP of each obstacle with respect to the traveling prediction course RCR, as a lateral position for correction gain calculation, based on the lateral distance calculated in step 1310. A method of calculating the lateral position is the same as the above-described calculation method in step 515.

Figure 15:
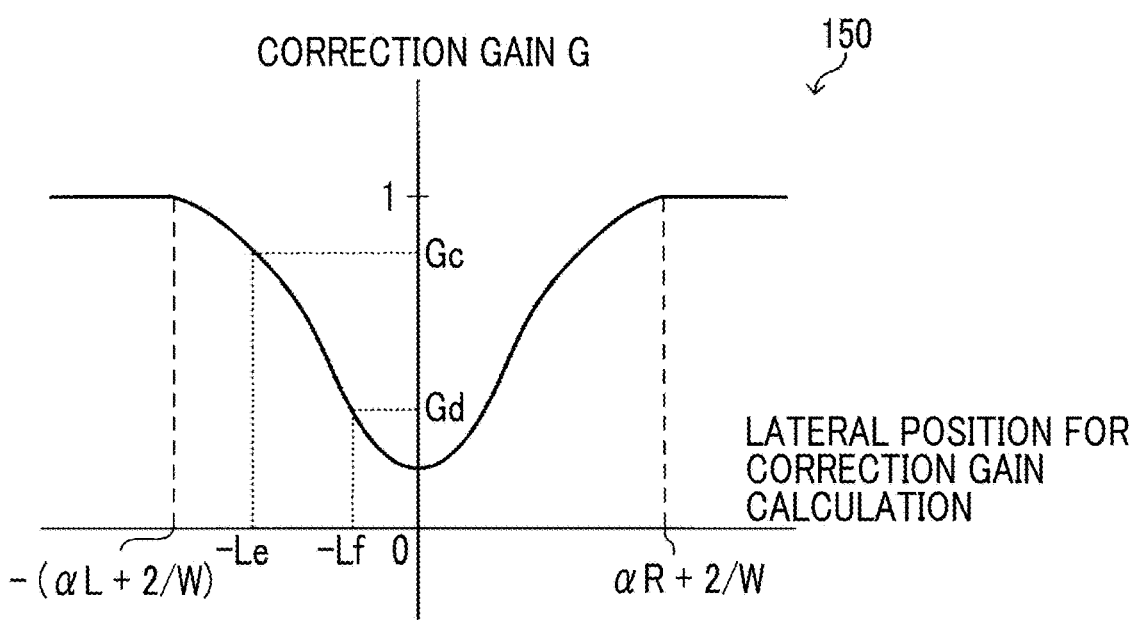
FIG. 15 is a diagram illustrating correction gain information.

Step 1320: the CPU refers to correction gain information 150 shown in FIG. 15 to obtain a correction gain G corresponding to the lateral position for correction gain calculation calculated in step 1315 with respect to each obstacle extracted in step 425 of FIG. 12.

Here, the details of the correction gain information 150 will be described with reference to FIG. 15. The correction gain information 150 is stored in the ROM of the driving assistance ECU 10 in a look-up table (map) format. The correction gain information 150 prescribes a relationship between the lateral position for correction gain calculation and the correction gain G. In the correction gain information 150, the correction gain G is a value greater than "0" and equal to or less than "1", and is set to a value for correcting the allowance time TTC to a smaller value as the lateral position for correction gain calculation comes closer to "0". As described later, the allowance time TTC is corrected by multiplying the allowance time TTC by the correction gain G, and the allowance time after correction TTCg (=G·TTC) is calculated.

Therefore, in the correction gain information 150, as the lateral distance indicated by the lateral position for correction gain calculation decreases, the correction gain G is set to be smaller. That is, as the central point CP of an obstacle becomes closer to the traveling prediction course RCR, the allowance time TTC for the obstacle is corrected so as to have a smaller value, and the corrected allowance time TTC is obtained as the allowance time TTCg after correction. As described later, the CPU selects an obstacle for which the allowance time TTCg after correction is shortest as an obstacle which is a target for processing. Thus, as the lateral distance of a certain obstacle decreases, the obstacle is more likely to be selected as an obstacle which is a target for processing.

With the correction gain information 150, in a case where the lateral position for correction gain calculation is equal to or greater than the "value obtained by adding half (W/2) of the vehicle width W to the distance αR", and a case where the lateral position for threshold calculation is equal to or less than the "value obtained by inverting the sign of the value obtained by adding half (W/2) of the vehicle width W to the distance αL", the correction gain G is set to "1". Therefore, in a case where the central point CP of an obstacle is present further rightward than the traveling prediction course RCR, and a lateral distance between the central point CP of the obstacle and the traveling prediction course RCR is equal to or greater than the "value obtained by adding half (W/2) of the vehicle width W to the distance αR", the correction gain G is set to "1", and thus the allowance time TTC for the obstacle is not substantially corrected (that is, the allowance time TTCg after correction is equal to the allowance time TTC). Similarly, in a case where the central point CP of the obstacle is present further leftward than the traveling prediction course RCR, and the lateral distance between the central point CP of the obstacle and the traveling prediction course RCR is equal to or greater than the "value obtained by adding half (W/2) of the vehicle width W to the distance αL", the correction gain G is set to "1", and thus the allowance time TTC for the obstacle is not substantially corrected (that is, the allowance time TTCg after correction is equal to the allowance time TTC).

Step 1325: the CPU calculates the allowance time TTCg after correction by correcting the allowance time TTC for each obstacle using the correction gain G set in each obstacle in step 1320. Specifically, the CPU calculates the allowance time TTCg after correction by multiplying the correction gain G set in each obstacle in step 1320 by the allowance time TTC for each obstacle.

Step 1330: the CPU selects an obstacle for which the allowance time TTCg after correction calculated in step 1325 is shortest as an obstacle which is a target for processing. Thereafter, the CPU proceeds to step 1395, temporarily terminates this routine, and proceeds to step 440 shown in FIG. 12.

In step 440, the CPU executes a threshold setting process, sets the threshold T1th in the obstacle which is a target for processing, and proceeds to step 445. In step 445, the CPU determines whether the allowance time TTC for the obstacle which is a target for processing is equal to or less than the threshold T1th. In a case where the allowance time TTC for the obstacle which is a target for processing is equal to or less than the threshold T1th, the CPU makes a determination of "Yes" in step 445, proceeds to step 450, performs vehicle control (attention attraction in the present example) on the obstacle which is a target for processing, proceeds to step 1295, and temporarily terminates this routine. On the other hand, in a case where the allowance time TTC for the obstacle which is a target for processing is greater than the threshold T1th, the CPU makes a determination of "No" in step 445, proceeds to step 1295, and temporarily terminates this routine.

Figure 14:
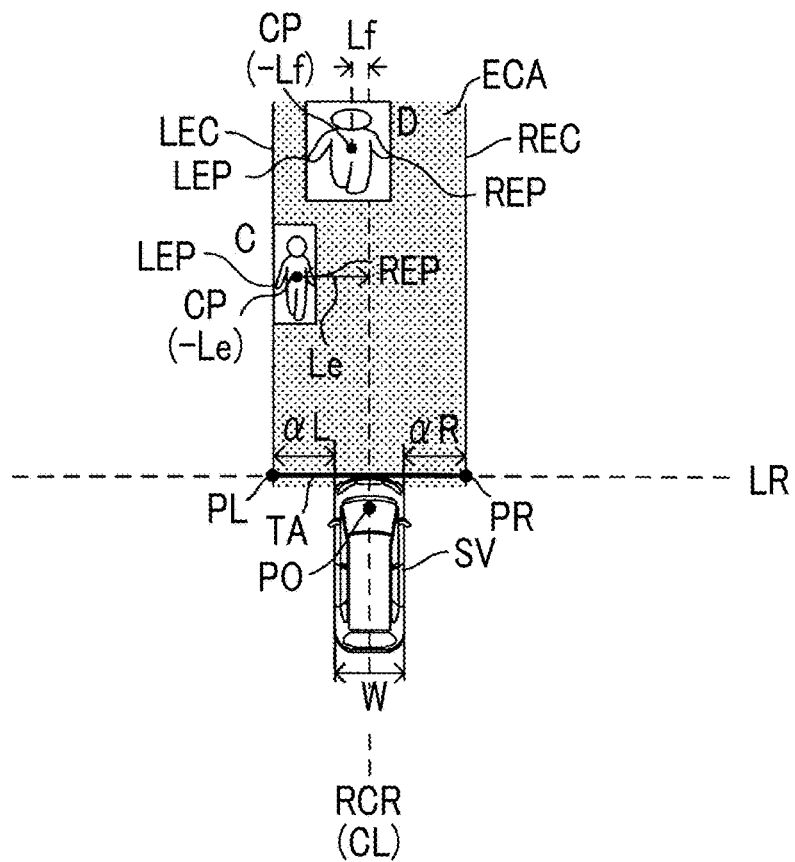
FIG. 14 is a diagram illustrating a positional relationship between a plurality of pedestrians (obstacles) and the host vehicle in a case where one pedestrian is selected as an obstacle which is a target for processing from the pedestrians.

Next, "the process of selecting an obstacle which is a target for processing among a plurality of pedestrians (obstacles)" executed by the third device will be described with reference to an example shown in FIG. 14. Here, in the example shown in FIG. 14, it is assumed that conditions described below are entirely established. The host vehicle SV is not turning and is traveling straight ahead. Targets other than "a pedestrian C and a pedestrian D" are not detected. Both the central position (CP) of the pedestrian C and the central position (CP) of the pedestrian D are present within the traveling prediction course area ECA and are located further leftward than the traveling prediction course RCR. The allowance time TTC (time=TTC (C) to be taken until the pedestrian C comes closest to the host vehicle SV) of the pedestrian C is smaller than the allowance time TTC (time=TTC (D) to reach a point in time at which the pedestrian D is predicted to collide with the host vehicle SV) of the pedestrian D (that is, TTC (C)<TTC (D)).

Since both the central position of the pedestrian C and the central position of the pedestrian D are present within the traveling prediction course area ECA, both "the pedestrian C and the pedestrian D" are extracted as obstacles in step 425. Therefore, since a plurality of obstacles (that is, the pedestrian C and the pedestrian D) is extracted, the determination in step 1220 is "Yes", and the process of selecting an obstacle which is a target for processing is executed in step 1240 (that is, subroutine of FIG. 13).

Therefore, in step 1305, the central point CP of the pedestrian C and the central point CP of the pedestrian D are extracted. Further, in step 1310, a lateral distance "Le" between the central point CP of the pedestrian C and the traveling prediction course RCR and a lateral distance "Lf" between the central point CP of the pedestrian D and the traveling prediction course RCR are calculated. Both the central point CP of the pedestrian C and the central point CP of the pedestrian D are located further leftward than the traveling prediction course RCR. For this reason, in step 1315, the lateral position of the central point CP of the pedestrian C is calculated to be "−Le", and the lateral position of the central point CP of the pedestrian D is calculated to be "−Lf". That is, the lateral position for correction gain calculation of the pedestrian C is set to "−Le", and the lateral position for correction gain calculation of the pedestrian D is set to "−Lf".

In step 1320, the correction gain G (=Gc) corresponding to the lateral position for correction gain calculation "−Le" of the pedestrian C is set, and the correction gain G (=Gd) corresponding to the lateral position for correction gain calculation "−Lf" of the pedestrian D is set, based on the correction gain information 150. Here, as shown in FIG. 14, the lateral distance "Lf" between the pedestrian D and the traveling prediction course RCR is smaller than the lateral distance "Le" between the pedestrian C and the traveling prediction course RCR. Therefore, as shown in FIG. 15, the correction gain Gd set in the pedestrian D becomes smaller than the correction gain Gc set in the pedestrian C.

In step 1325, the allowance time TTCg (C) after correction of the pedestrian C and the allowance time TTCg (D) after correction of the pedestrian D are calculated as follows. In the following, TTC (C) is the allowance time TTC for the pedestrian C, and TTC (D) is the allowance time TTC for the pedestrian D.

$$TTCg(C)=Gc \cdot TTC(C)$$

$$TTCg(D)=Gd \cdot TTC(D)$$

Incidentally, in the above-described assumption of the present example, a relation of TTC (C)<TTC (D) is established. Incidentally, as described above, since the correction gain Gd of the pedestrian D is smaller than the correction gain Gc of the pedestrian C, the allowance time TTCg (D) after correction of the pedestrian D may become shorter than the allowance time TTCg (C) after correction of the pedestrian C. That is, the following inequality expression may be established.

$$TTCg(D)<TTCg(C)$$

For this reason, in a case where the relation of the inequality expression (TTCg (D)<TTCg (C)) is established, the pedestrian D is selected as an obstacle which is a target for processing, in step 1330 of selecting an obstacle for which the allowance time TTCg after correction is shortest as an obstacle which is a target for processing. That is, even in a case where the allowance time TTC (C) for the pedestrian C is smaller than the allowance time TTC (D) for the pedestrian D, the pedestrian D may be selected as an obstacle which is a target for processing, in the process of selecting an obstacle which is a target for processing.

The pedestrian D is closer to the traveling prediction course RCR than the pedestrian C, and thus the possibility of the pedestrian D and the host vehicle SV colliding with each other is higher than the possibility of the pedestrian C and the host vehicle SV colliding with each other. In other words, a driver has a higher need to preferentially perform a driving operation for avoiding collision with or proximity to the pedestrian D rather than a driving operation for avoiding collision with or proximity to the pedestrian C.

However, since the allowance time TTC (C) for the pedestrian C is smaller than the allowance time TTC (D) for the pedestrian D, the above-described first device selects the pedestrian C as an obstacle which is a target for processing, and vehicle control (for example, attention attraction) with respect to pedestrian C is preferentially performed in a case where the allowance time TTC (C) for the pedestrian C is equal to or less than the threshold T1th.

On the other hand, the third device selects an obstacle for which the "value (that is, allowance time TTCg after correction) corrected so that the allowance time TTC for the obstacle apparently decreases as a lateral distance between the obstacle and the traveling prediction course RCR decreases" is shortest, as an obstacle which is a target for processing, in the above-described process of selecting an obstacle which is a target for processing. Thus, even in a case where the allowance time TTC is longer than that for the pedestrian C, the pedestrian D which is more likely to collide with the host vehicle SV than the pedestrian C has a tendency to be selected as an obstacle which is a target for processing. As a result, even in the above-stated situation, it is possible to reliably perform vehicle control on an obstacle having a relatively high possibility of colliding with the host vehicle SV.

Modification Example of Third Device

A modification example of the third device is different from the third device, in solely that the lateral position of an endpoint having a smaller lateral distance out of the left endpoint LEP and the right endpoint REP of the obstacle is used as a lateral position for correction gain calculation, in the process of selecting an obstacle which is a target for processing. Hereinafter, a description will be given with a focus on this difference.

Figure 16:
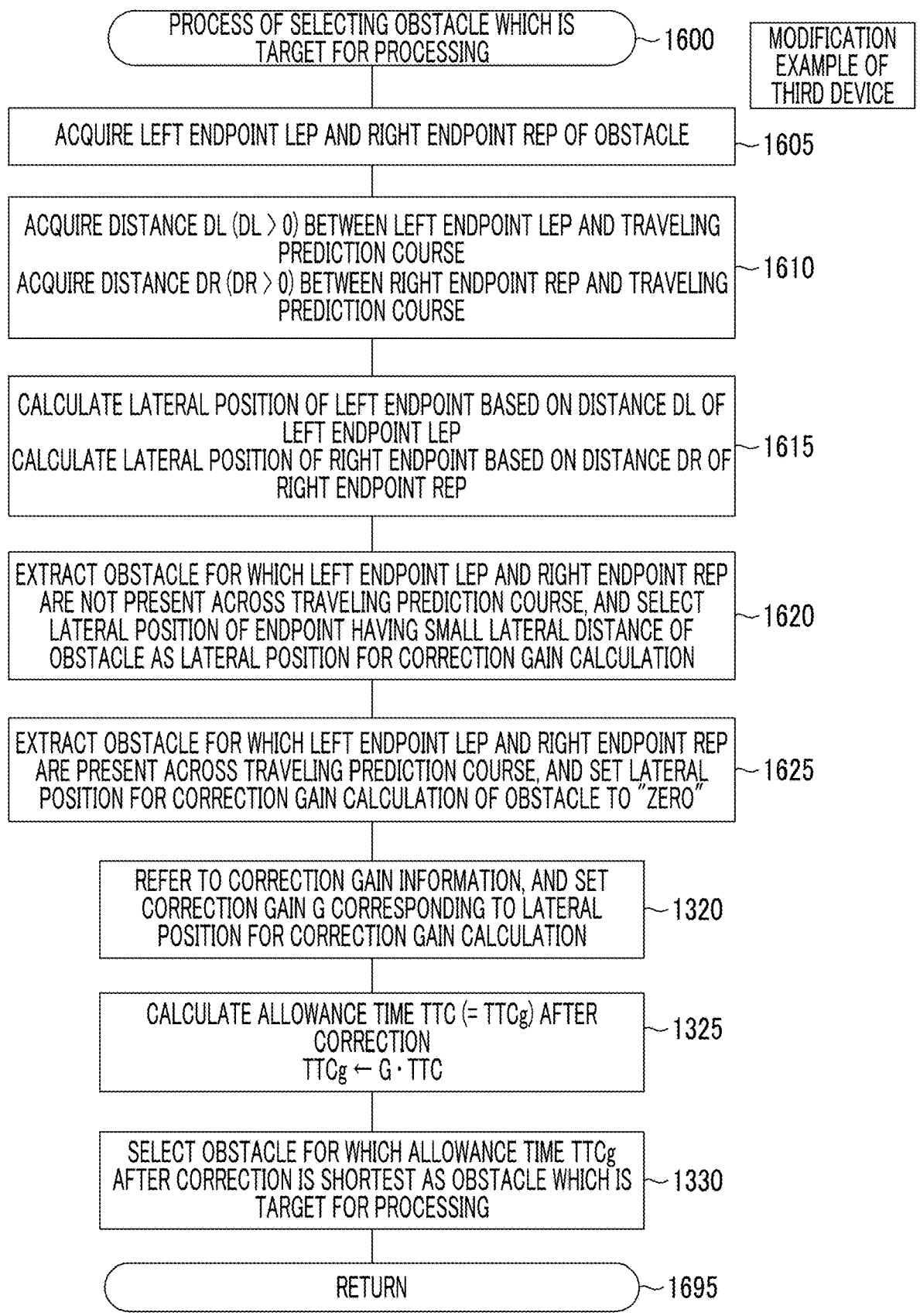
FIG. 16 is a flowchart illustrating a routine which is executed by the CPU of the driving assistance ECU in a process of selecting an obstacle which is a target for processing according to a modification example of the third embodiment of the present disclosure.

Similarly to the CPU of the third device, the CPU of the modification example of the third device executes the routine shown in FIG. 12 whenever a predetermined time elapses. However, in a case where the CPU of the modification example of the third device proceeds to step 1240 of FIG. 12, the CPU executes a subroutine shown as a flowchart in FIG. 16, instead of that shown in FIG. 13. That is, the routine of FIG. 16 is a routine for selecting an obstacle which is a target for processing. Meanwhile, steps of performing the same processes as those in the steps shown in FIG. 13 among steps shown in FIG. 16 are assigned the same numerals and signs as those assigned to such steps of FIG. 13. The detailed description of these steps will not be given.

That is, in a case where the CPU proceeds to step 1240, the CPU starts a process from step 1600 of FIG. 16, performs processes of step 1605 to step 1625 described below in order, and proceeds to step 1320.

Step 1605: similarly to step 505 the CPU extracts the left endpoint LEP and the right endpoint REP of the obstacle based on information transmitted from the camera sensor 11.

Step 1610: similarly to step 510, the CPU acquires the distance (left endpoint distance) DL between the left endpoint LEP and the traveling prediction course RCR, and acquires the distance (right endpoint distance) DR between the right endpoint REP and the traveling prediction course RCR.

Step 1615: similarly to step 515, the CPU calculates the position (lateral position, lateral coordinates) of the left endpoint LEP with respect to the traveling prediction course RCR, based on the left endpoint distance DL calculated in step 1610. Further, the CPU calculates the position (lateral position, lateral coordinates) of the right endpoint REP with respect to the traveling prediction course RCR, based on the right endpoint distance DR calculated in step 1610.

Step 1620: the CPU selects an obstacle for which the left endpoint LEP and the right endpoint REP are located not to be across the traveling prediction course RCR. That is, the CPU selects an obstacle for which both the lateral position of the left endpoint LEP and the lateral position of the right endpoint REP are a positive value or a negative value. The CPU selects the lateral position of an endpoint having a smaller lateral distance out of the left endpoint LEP and the right endpoint REP of the selected obstacle, as a lateral position for correction gain calculation.

Step 1625: the CPU selects an obstacle for which the left endpoint LEP and the right endpoint REP are located across the traveling prediction course RCR. That is, the CPU selects an obstacle for which the lateral position of the left endpoint LEP is a negative value and the lateral position of the right endpoint REP of the obstacle is a positive value. The CPU sets the lateral position for correction gain calculation of the selected obstacle to "0".

After step 1625, the CPU executes processes of step 1320 to 1330 in order. That is, the CPU calculates the allowance time TTCg after correction for each obstacle by correcting the allowance time TTC for each obstacle using the correction gain G corresponding to the lateral position for correction gain calculation of each obstacle. The CPU selects an obstacle for which the allowance time TTCg after correction is shortest as an obstacle which is a target for processing. Thereafter, as described above, the CPU proceeds to step 1695, temporarily terminates this routine, and proceeds to step 440 shown in FIG. 12.

Through the above processes, the lateral position of an endpoint closer to the traveling prediction course RCR out of the left endpoint LEP and the right endpoint REP of the obstacle is used as a lateral position for correction gain calculation. Thereby, since the correction gain G is set in consideration of the lateral width of the obstacle, an obstacle having a relatively high possibility of colliding with the host vehicle SV is more likely to be selected as an obstacle which is a target for processing. As a result, it is possible to perform vehicle control at an appropriate timing on an obstacle having a relatively high possibility of colliding with the host vehicle SV.

The aspects of the present disclosure are not limited to the embodiments, and various modification examples can be adopted in the scope of the aspects of the present disclosure. In step 450 shown in FIGS. 4 and 12 and step 1050 shown in FIG. 10, the first to third devices may output a warning sound with respect to an obstacle which is a target for processing for which the allowance time TTC is equal to or less than the threshold T1th, from the speaker 15, instead of display of the attention-attracting screen 80 or in addition to the display. The vehicle control may be called warning sound output control.

Further, in step 450 shown in FIGS. 4 and 12 and step 1050 shown in FIG. 10, the first to third devices may perform braking control on an obstacle which is a target for processing for which the allowance time TTC is equal to or less than the threshold T1th, instead of display of attention-attracting screen 80 or in addition to the display. Specifically, in a case where the obstacle which is a target for processing for which the allowance time TTC is equal to or less than the threshold T1th is present, the first to third devices outputs a braking control instruction to the brake ECU 20. In a case where the braking control instruction is accepted, the brake ECU 20 controls the brake actuator 22, and adds a braking force to the host vehicle so as to decelerate and/or stop the host vehicle SV before collision with or abnormal proximity to the obstacle which is a target for processing for which the allowance time TTC is equal to or less than the threshold T1th.

Meanwhile, in a case where a plurality of obstacles which is a target for processing for which the allowance time TTC is equal to or less than the threshold T1th is present, the warning sound output control and/or the braking control is performed on an obstacle which is a target for processing for which the allowance time TTC is minimized.

The display control of the attention-attracting screen 80, the warning sound output control and the braking control described above are all vehicle control "for avoiding contact of the host vehicle SV with the obstacle which is a target for processing for which the allowance time TTC is equal to or less than the threshold T1th or abnormal proximity of the host vehicle SV to the obstacle". That is, with the display control of the attention-attracting screen 80, a driver's eyes are guided in the direction of the obstacle which is a target for processing. Thereby, it is possible to urge a driver to perform a driving operation for avoiding collision of the obstacle which is a target for processing with the host vehicle SV or abnormal proximity of the obstacle to the host vehicle. With the warning sound output control, it is possible to urge a driver to perform the above-described driving operation by a warning sound being output from the speaker 15. Further, with the braking control, a braking force is added to the host vehicle so as to decelerate and/or stop the host vehicle SV before collision with an obstacle which is a target for processing, and thus it is possible to avoid contact of the host vehicle SV with the obstacle which is a target for processing or abnormal proximity of the host vehicle SV to the obstacle.

Further, as described above, in step 450 shown in FIGS. 4 and 12 and step 1050 shown in FIG. 10, the first to third devices may perform the display control for displaying the attention-attracting screen 80, the warning sound output control and the braking control.

In this case, it is preferable that a threshold T1th for display control, a threshold T2th for warning sound output control and a threshold T3th for braking control are set in the first to third devices. In a case where an obstacle which is a target for processing is selected, each of the thresholds T1th to T3th with respect to the obstacle which is a target for processing is set in the threshold setting process shown in FIG. 5. In step 450 shown in FIGS. 4 and 12 and step 1050 shown in FIG. 10, the CPU determines whether the allowance time TTC for the obstacle which is a target for processing is equal to or less than each of the thresholds T1th to T3th. In a case where the allowance time TTC for the obstacle which is a target for processing is equal to or less than any of the thresholds T1th to T3th, vehicle control corresponding to the threshold is performed.

In this case, it is preferable that the vehicle control is performed in order of the display control, the warning sound output control and the braking control. For this reason, it is preferable that values are set to decrease in order of the threshold T1th for display control, the threshold T2th for warning sound output control and the threshold T3th for braking control.

Further, the visual guidance icon 81 may be arbitrarily designed in a range having each function of guiding a driver's eyes described above.

Further, in step 425, in a case where the CPU extracts an obstacle from the target detected by the front radar sensor 12C, the CPU may extract a target "present within the traveling prediction course area or predicted to be enter into the traveling prediction course area in the future and to intersect the tip area of the host vehicle", as an obstacle, regardless of whether the target is a pedestrian.

Further, the first device and the third device has easily established the specific condition (that is, condition in which the allowance time TTC is set to be equal to or less than the threshold T1th) for performing vehicle control (attention attraction) by setting the threshold T1th in step 440 in accordance with the lateral position for threshold calculation. On the other hand, the first device and the third device may easily establish the specific condition for performing vehicle control (attention attraction) by correcting the allowance time used in step 445 in accordance with the lateral position for threshold calculation. That is, in this case, the first device and the third device may be configured to set a gain GG (gain having the same tendency as that of the correction gain G shown in FIG. 15) decreasing as the lateral position for threshold calculation becomes closer to "0", obtain an allowance time TTCs for vehicle control determination by multiplying the gain GG by the allowance time TTC, and perform vehicle control when the allowance time TTCs for vehicle control determination is set to be equal to or less than the threshold T1th maintained at a constant value. The above-described modification can also be applied to a case where the second device executes the process of step 1040 in FIG. 10.

What is claimed is:

1. A driving assistance device comprising:
a target information acquisition device configured to acquire target information relating to a position of a target around a host vehicle with respect to the host vehicle and a speed of the target relative to the host vehicle;
a vehicle state information acquisition device configured to acquire vehicle state information relating to a traveling state of the host vehicle; and
an electronic control unit configured to
estimate a traveling prediction course of a central point in a vehicle-width direction of the host vehicle based on the vehicle state information,
extract a target having a possibility of colliding with the host vehicle, as an obstacle, based on the target information and the traveling prediction course,
calculate a distance between an endpoint of the obstacle closest to the traveling prediction course and the traveling prediction course and set the calculated distance as a lateral distance,
calculate an index value changing depending on a degree of need of vehicle control for avoiding contact of the host vehicle with the obstacle or abnormal proximity of the host vehicle to the obstacle based on at least the target information,
determine whether a specific condition which is set so as to be established when the vehicle control is needed in accordance with a result of comparison between the index value and a predetermined threshold is established, and
perform the vehicle control for avoiding contact of the host vehicle with the obstacle or abnormal proximity of the host vehicle to the obstacle when the electronic control unit determines that the specific condition is established,
wherein the electronic control unit is configured to change at least one of the threshold and the index value based on the lateral distance such that the specific condition has more of a tendency to be established as the lateral distance decreases.

2. The driving assistance device according to claim 1, wherein the electronic control unit is configured to set the calculated distance as the lateral distance in a case where the obstacle is not located across the traveling prediction course, and to set the lateral distance to zero in a case where the obstacle is located across the traveling prediction course.

3. The driving assistance device according to claim 1, wherein:
the electronic control unit is configured to calculate an allowance time which is a time to be taken until the obstacle comes into contact with or comes closest to the host vehicle, as the index value;
the electronic control unit is configured to determine whether the specific condition is established by determining whether the allowance time as the index value is set to be equal to or less than a threshold time as the threshold; and
the electronic control unit is configured to set a time increasing as the lateral distance decreases as the threshold time such that the specific condition has more of a tendency to be established as the lateral distance decreases.

4. The driving assistance device according to claim 1, wherein:
the electronic control unit is configured to specify a first endpoint and a second endpoint of the obstacle in a direction perpendicular to the traveling prediction course; and
the electronic control unit is configured to adopt the smaller of a first distance which is a distance between the first endpoint and the traveling prediction course and a second distance which is a distance between the second endpoint and the traveling prediction course, as the lateral distance, in a case where the electronic control unit determines that both the first endpoint and the second endpoint are present in just one area of a right area and a left area divided by the traveling prediction course and that the obstacle is not located across the traveling prediction course.

5. The driving assistance device according to claim 1, wherein:
in a case where a plurality of obstacles extracted by the electronic control unit is present, the electronic control unit is configured to calculate an index value after correction by correcting the index value calculated with respect to each of the extracted obstacles so as to be a value indicating that the degree of need of vehicle control becomes higher as a lateral distance for selection decreases which is a distance between a central point of each of the extracted obstacles in a direction perpendicular to the traveling prediction course and the traveling prediction course;
the electronic control unit is configured to select an obstacle for which the degree of need of vehicle control indicated by the index value after correction is highest, as an obstacle which is a target for processing, from the extracted obstacles; and
the electronic control unit is configured to perform the vehicle control when the electronic control unit determines that the specific condition is established with respect to the obstacle which is a target for processing.

6. The driving assistance device according to claim 5, wherein:
the electronic control unit is configured to calculate an allowance time which is a time to be taken until the obstacle comes into contact with or comes closest to the host vehicle, as the index value;
the electronic control unit is configured to acquire an index value correction gain decreasing as the lateral distance for selection of each of the extracted obstacles decreases based on the lateral distance for selection, and to set an allowance time after correction, calculated by multiplying the index value correction gain by the allowance time, as the index value after correction; and
the electronic control unit is configured to select an obstacle for which the allowance time after correction is smallest, as the obstacle which is a target for processing, from the extracted obstacles.

7. The driving assistance device according to claim 1, wherein:
in a case where a plurality of obstacles extracted by the electronic control unit is present, the electronic control unit is configured to calculate an index value after correction by correcting the index value calculated with respect to each of the extracted obstacles so as to be a value indicating that the degree of need of vehicle control becomes higher as a lateral distance for selection decreases which is the lateral distance calculated by the electronic control unit with respect to each of the extracted obstacles;

the electronic control unit is configured to select an obstacle for which the degree of need of vehicle control indicated by the index value after correction is highest, as an obstacle which is a target for processing, from the extracted obstacles; and the electronic control unit is configured to perform the vehicle control when the electronic control unit determines that the specific condition is established with respect to the obstacle which is a target for processing.

8. The driving assistance device according to claim 7, wherein:

the electronic control unit is configured to calculate an allowance time which is a time to be taken until the obstacle comes into contact with or comes closest to the host vehicle, as the index value;

the electronic control unit is configured to acquire an index value correction gain decreasing as the lateral distance for selection of each of the extracted obstacles decreases based on the lateral distance for selection, and to set an allowance time after correction, calculated by multiplying the index value correction gain by the allowance time, as the index value after correction; and the electronic control unit is configured to select an obstacle for which the allowance time after correction is smallest, as the obstacle which is a target for processing, from the extracted obstacles.

9. The driving assistance device according to claim 1, further comprising a display device which displays an attention-attracting screen for guiding a driver's eyes, wherein when the electronic control unit determines that the specific condition is established, the electronic control unit is configured to perform, as the vehicle control, attention-attracting control for causing the display device to display a screen including a display element for guiding the driver's eyes in a direction of an obstacle having the index value by which the specific condition is established, as the attention-attracting screen.

* * * * *